US007995122B2

(12) United States Patent
Suzuki

(10) Patent No.: US 7,995,122 B2
(45) Date of Patent: *Aug. 9, 2011

(54) SOLID-STATE IMAGE CAPTURING DEVICE, SMEAR CHARGE REMOVING METHOD AND DIGITAL STILL CAMERA USING THE SAME

(75) Inventor: Nobuo Suzuki, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 539 days.

This patent is subject to a terminal disclaimer.

(21) Appl. No.: 12/081,181

(22) Filed: Apr. 11, 2008

(65) Prior Publication Data

US 2008/0198250 A1 Aug. 21, 2008

Related U.S. Application Data

(63) Continuation of application No. 10/329,795, filed on Dec. 27, 2002, now Pat. No. 7,375,750.

(30) Foreign Application Priority Data

Dec. 28, 2001 (JP) ............................... P.2001-399713

(51) Int. Cl.
*H04N 9/64* (2006.01)

(52) U.S. Cl. ......... 348/249; 348/250; 348/296; 348/298

(58) Field of Classification Search ............... 348/221.1, 348/243, 248, 249, 250, 280, 296, 298, 311, 348/315, 317, 322; 250/208.1; 257/208.1
See application file for complete search history.

(56) References Cited

U.S. PATENT DOCUMENTS

| 4,577,230 | A | | 3/1986 | Ozawa et al. | |
|---|---|---|---|---|---|
| 4,578,707 | A | | 3/1986 | Ozawa et al. | |
| 4,684,993 | A | * | 8/1987 | Berger et al. | 348/324 |
| 4,853,786 | A | * | 8/1989 | Yamawaki et al. | 348/248 |
| 5,153,732 | A | | 10/1992 | Oda et al. | |
| 5,282,041 | A | | 1/1994 | Tani et al. | |
| 5,694,167 | A | | 12/1997 | Hashimoto | |

(Continued)

FOREIGN PATENT DOCUMENTS

JP 2-62170 A 3/1990

(Continued)

*Primary Examiner* — Lin Ye
*Assistant Examiner* — Chriss S Yoder, III
(74) *Attorney, Agent, or Firm* — Birch, Stewart, Kolasch & Birch, LLP

(57) ABSTRACT

In a solid-state image capturing device including a pixel array arranged in a row direction and a column direction orthogonal thereto, and a vertical register having a plurality of transfer electrodes which serves to read signal charges Qa, Qb, . . . generated by light receipt of each of pixels A, B, . . . and to sequentially transfer the signal charge in the column direction upon receipt of a transfer pulse, an electric potential well for a smear charge is generated and an unnecessary charge q in the vertical register is collected into the electric potential well for a smear charge before the signal charge is read from the pixels A, B, . . . onto the vertical register (a timing t707), an electric potential well for signal charge transfer is then generated and the signal charges Qa, Qb, . . . are read from the pixels A, B, . . . onto the electric potential well for signal charge transfer, and the electric potential well for a smear charge and the electric potential well for signal charge transfer are transferred in the direction of a horizontal register without mixing an unnecessary charge 3$q$ with a signal charge Q.

10 Claims, 21 Drawing Sheets

U.S. PATENT DOCUMENTS

| | | |
|---|---|---|
| 5,867,212 A | 2/1999 | Toma et al. |
| 6,798,450 B2 | 9/2004 | Baer |
| 2003/0107662 A1 | 6/2003 | Suzuki |

FOREIGN PATENT DOCUMENTS

| | | |
|---|---|---|
| JP | 2001-119629 A | 4/2001 |
| JP | 2001-145027 A | 5/2001 |

* cited by examiner

FIG. 2
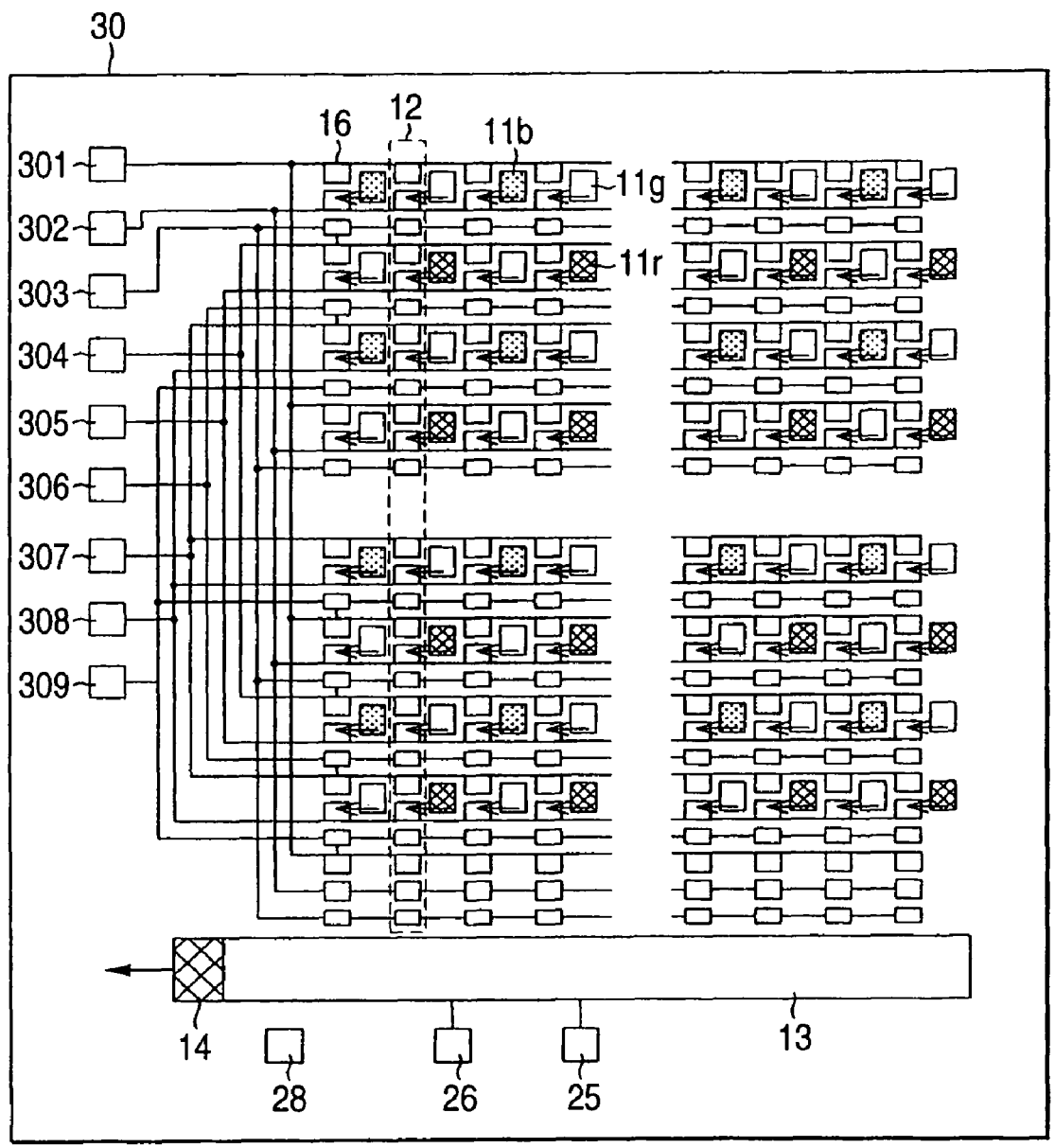
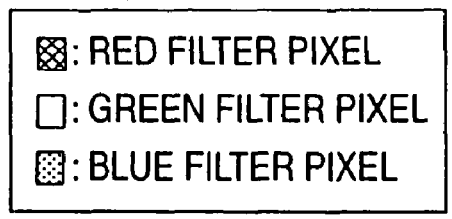

FIG. 5
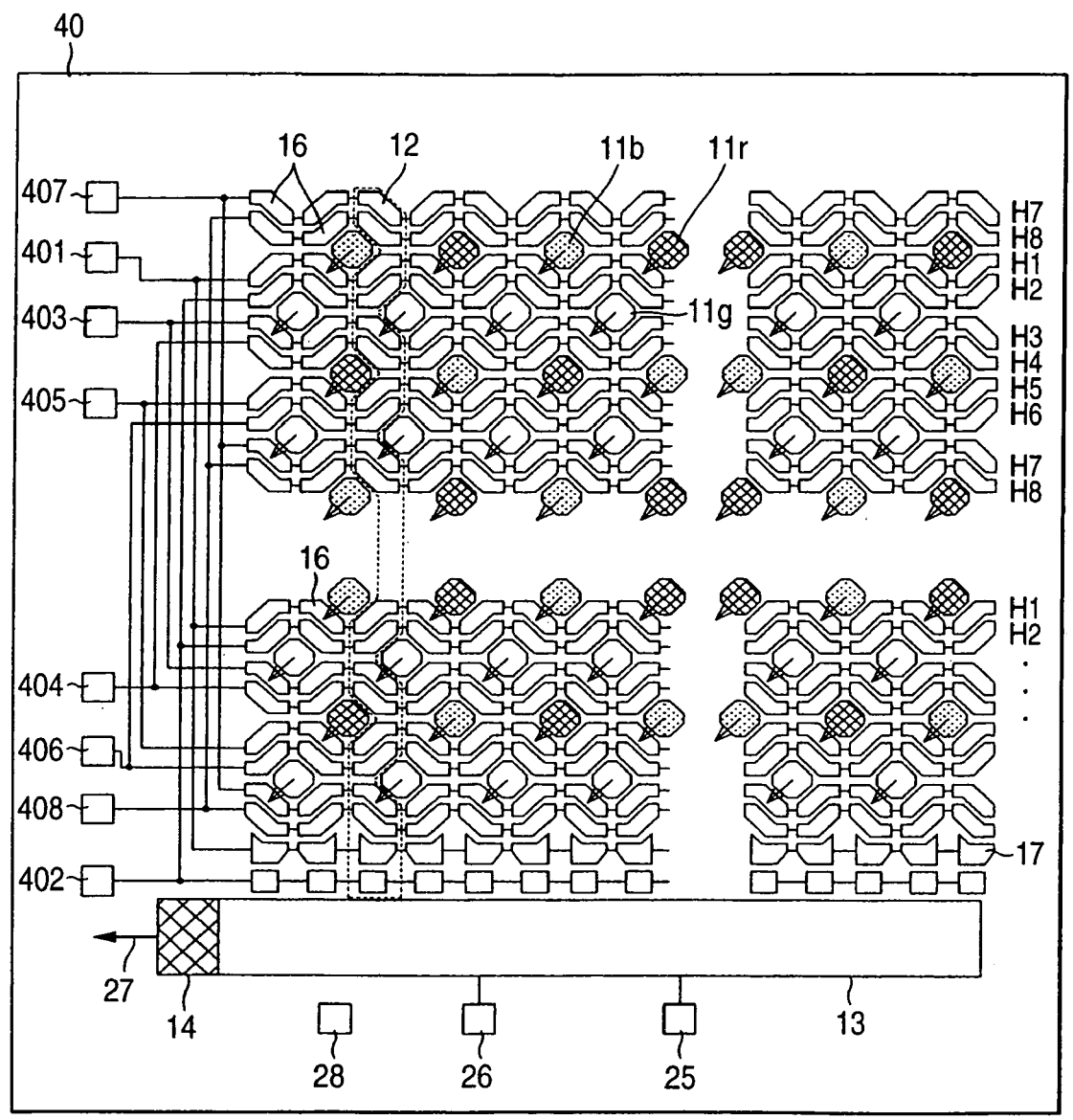
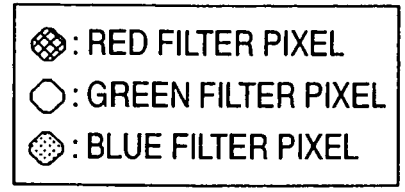

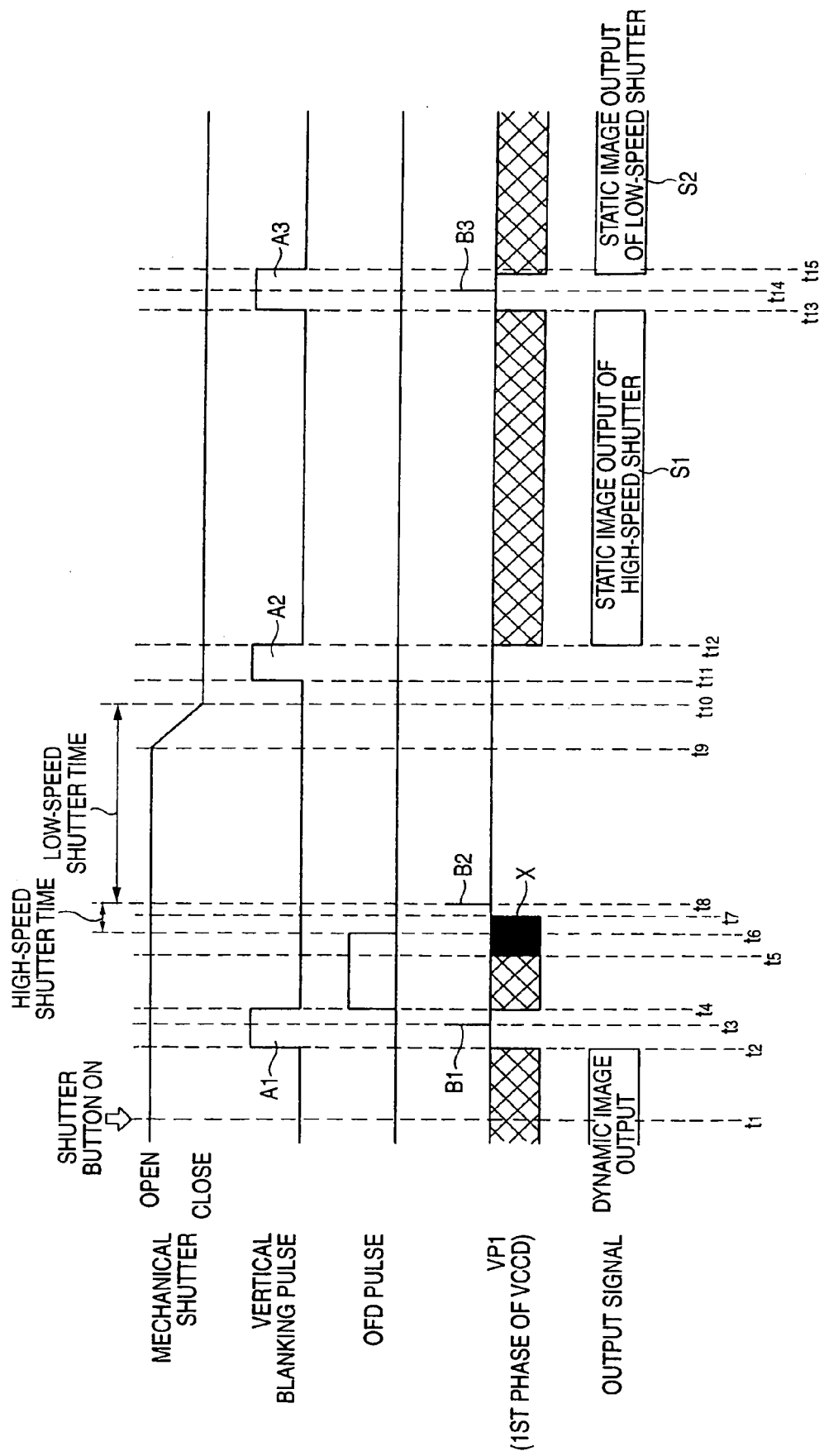

SOLID-STATE IMAGE CAPTURING DEVICE, SMEAR CHARGE REMOVING METHOD AND DIGITAL STILL CAMERA USING THE SAME

CROSS-REFERENCE TO RELATED APPLICATION

This is a continuation application of application Ser. No. 10/329,795, filed Dec. 27, 2002, now U.S. Pat. No. 7,375,750 which is a non-provisional application that claims priority under 35 U.S.C. §119 on Patent Application No. 2001-399713 filed in Japan on Dec. 28, 2001, the entire contents of all of which are hereby incorporated by reference.

BACKGROUND OF THE INVENTION

1. Field of the Invention

The present invention relates to a digital still camera having an electronic shutter function, and more particularly to a solid-state image capturing device capable of acquiring a captured image which is not influenced by a smear when releasing a high-speed shutter to capturing an image by the electronic shutter function, a smear charge removing method and a digital still camera.

2. Description of the Related Art

FIG. 18 is a schematic plan view showing a conventional solid-state image capturing device having pixels arranged like a square grid. In a solid-state image capturing device 10, a photoreceptor group includes a photoreceptor 11b having a blue filter attached thereto and a photoreceptor 11g having a green filter attached thereto which are alternately arranged in a transverse row and a photoreceptor group includes the photoreceptor 11g having the green filter attached thereto and a photoreceptor 11r having a red filter attached thereto which are alternately arranged in a transverse row, and both of the groups are alternately arranged in a vertical direction.

A transfer electrode 16 is provided around each of the photoreceptors 11r, 11g and 11b, and a transfer electrode group in a vertical column which is constituted by the transfer electrode 16 forms a vertical CCD register 12 (only one column is shown in a dotted line). A first transfer electrode 16 group in a transverse row which is arranged in the upper side portions of the photoreceptors 11r, 11g and 11b is connected to an electrode terminal 21, a second transfer electrode 16 group in a transverse row which is arranged in the lower side portions of the photoreceptors 11r, 11g and 11b is connected to an electrode terminal 22, and a third transfer electrode 16 group in a transverse row which is provided between a photoreceptor group arranged in a transverse column and a photoreceptor group arranged in a next transverse row is connected to an electrode terminal 23.

When a reading potential is applied to a reading gate which is not shown in order to read image signals picked up by the solid-state image capturing device 10 (the received charges of the photoreceptors 11r, 11g and 11b), the received charges (signal charges) of the photoreceptors 11r, 11g and 11b are read onto the transfer electrode 16 of the vertical CCD register 12 as shown in an arrow on each of the photoreceptors 11r, 11g and 11b.

A transfer potential (a transfer pulse) is sequentially applied to each of the electrode terminals 21 to 23 so that a received charge is transferred in a vertical direction (a downward direction in the example shown in the drawing) and a signal charge is transferred to a horizontal register 13 provided in the lowest stage. The signal charge is transferred in a horizontal direction by the application of the transfer pulse to electrode terminals 25 and 26 and is output from an output section 14 of the horizontal register 13. Moreover, the solid-state image capturing device 10 is provided with an electrode terminal 28 for OFD pulse application which will be described below.

FIG. 19 is a diagram showing the operation timing of a digital still camera mounting a mechanical shutter and the conventional solid-state image capturing device. In the case in which a shutter button is not released in the digital still camera, a captured image (a dynamic image) is displayed on the LCD display section at the back face of the camera to serve as a finder. Therefore, a vertical blanking pulse is generated at an interval of 1/30 to 1/60 second and a captured image signal is fetched every 1/30 to 1/60 second, for example.

When the shutter button is released (ON), a time interval between subsequent vertical blanking pulses is set to be 1/10 second, for example, and a static image is fetched with each of reading pulses B1, B2, . . . generated in vertical blanking pulses A1, A2, . . . .

However, the image signal fetched with the first reading pulse B1 is cancelled as a dummy output and the image signal fetched with the next reading pulse B2 is output as the image signals of a static image. Moreover, an OFD (overflow drain) pulse is applied after the first vertical blanking pulse A1, and the stored charges of the photoreceptors 11r, 11g and 11b formed on the surface of the semiconductor substrate of the solid-state image capturing device are drained toward the back side of the semiconductor substrate, and the stored charges of the photoreceptors 11r, 11g and 11b are zero cleared before the start of the image capturing.

Moreover, the transfer pulse (FIG. 19 shows only a second-phase transfer pulse VP2 and a change in an ON/OFF state is omitted in cross-hatching) which is applied from the electrode terminals 21, 22 and 23 to the vertical CCD register 12 is transmitted at a high speed immediately after the rise of the next vertical blanking pulse A2 till the rise of the reading pulse B2 (a blackened portion X in the drawing), and the electric charge in the vertical CCD register 12 is swept at a high speed before the signal charge of image information is fetched from the photoreceptors 11r, 11g and 11b into the vertical CCD register 12.

After the application of the OFD pulse till the closing of the mechanical shutter, the signal charges stored in the photoreceptors 11r, 11g and 11b are read and transferred to the vertical CCD register 12, and are output as the signals of a static image.

FIG. 20 is a timing chart for explaining the transfer state of the vertical CCD register 12 in the solid-state image capturing device 10 shown in FIG. 18. In the drawing, an encircled figure represents a last one digit of the designation of each of the electrode terminals 21 to 23. By cyclically applying a transfer potential (for example, pulses having a high level (0 V) and a low level (−8 V) to each electrode terminal, an electric potential well is moved along the vertical CCD register 12 and signal charges Qsiga, Qsigb, . . . constituting the image signals are transferred to the horizontal register 13.

At this time, light or an electron leaks from the photoreceptors 11r, 11g and 11b into the vertical CCD register 12 also before the received charges of pixels A, B, C . . . (the photoreceptors 11r, 11g and 11b) are read onto the vertical CCD register 12, and the original signal charges Qsiga, Qsigb, . . . , and furthermore, a smear charge qsmr causing a smear (a bright line in a longitudinal direction which appears in an image when the sun is photographed) enters each electric potential well.

As described above, a high-speed sweeping pulse X is applied to the vertical CCD register 12 in timings t8 to t9 of FIG. 19, and the smear charge qsmr is swept completely to cause each electric potential well to be completely empty (timing t9), and the signal charges Qsiga, Qsigb, . . . of the pixels A, B, . . . are then read (timing t10) and are transferred to the horizontal register 13. Consequently, it is possible to obtain an excellent image having no smear.

However, the operation timing of the digital still camera is illustrated in FIG. 19 as an example of a low-speed shutter using a mechanical shutter. While the vertical CCD register 12 is being driven by the sweeping pulse X, the mechanical shutter is maintained in a closing state. Therefore, there is no possibility that a new smear charge might enter the electric potential well.

On the other hand, in the case in which an image is to be picked up by a high-speed shutter, the mechanical shutter cannot release the high-speed shutter. As shown in FIG. 21, therefore, the high-speed shutter is released by the electronic shutter function. In this case, a period from the timing t6 immediately after the OFD pulse to the timing t8 of the reading pulse B2 is set to be a shutter time in a state in which the mechanical shutter is opened, and the signal charges stored in the photoreceptors 11r, 11g and 11b are read as the signals of captured images in the shutter time.

Also in this case, the smear charge in the vertical CCD register 12 is swept by the sweeping pulse X before the reading pulse B2 and the sweeping is carried out in a state in which the mechanical shutter is opened. Therefore, the smear charge qsmr enters the electric potential well during the sweeping.

In the case in which the high-speed shutter is released by the electronic shutter function, accordingly, smear charges qi+1, qi, . . . enter the electric potential well for transferring the signal charges Qsiga, Qsigb, . . . as shown in FIG. 22 so that the same smear charges are transferred together with the signal charges. The smear charges qi+1, qi, . . . cannot be distinguished from the signal charges Qsiga, Qsigb, . . . . For this reason, the picture quality of the captured image is deteriorated.

SUMMARY OF THE INVENTION

It is an object of the invention to provide a solid-state image capturing device capable of picking up an image which is not influenced by a smear even if a high-speed shutter is released by the electronic shutter function, a smear charge removing method and a digital still camera.

The object can be attained by a solid-state image capturing device including a pixel array arranged in a row direction and a column direction orthogonal thereto, a vertical register having a plurality of transfer electrodes which serves to read a signal charge generated by light receipt of each pixel and to sequentially transfer the signal charge in the column direction upon receipt of a transfer pulse, a horizontal register for receiving the signal charge transferred by the vertical register and transmitting the signal charge in a horizontal direction, and an output section for outputting the signal charge transferred by the horizontal register, the solid-state image capturing device comprising means for generating an electric potential well for a smear charge and collecting an unnecessary charge in the vertical register into the electric potential well for a smear charge before reading the signal charge from the pixel onto the vertical register, means for generating an electric potential well for signal charge transfer after collecting the unnecessary charge into the electric potential well for a smear charge and reading the signal charge from the pixel onto the electric potential well for signal charge transfer, and means for transferring the electric potential well for a smear charge and the electric potential well for signal charge transfer to the horizontal register without mixing the unnecessary charge with the signal charge. By such a structure, the smear charge is not mixed with the signal charge so that an excellent image having no smear can be obtained.

In the foregoing, it is preferable that there should be provided selecting means for switching a first mode for generating the electric potential well for a smear charge and transferring the signal charge by the vertical register and a second mode for transferring the signal charge by the vertical register without generating the electric potential well for a smear charge. By such a structure, in the case in which the cancellation of the smear charge is not required, the signal charge is transferred without providing the electric potential well for a smear charge. Therefore, high-speed transfer can be carried out.

In the foregoing, it is preferable that the solid-state image capturing device should be an interline transfer type CCD area image sensor or a frame interline transfer type CCD area image sensor, and furthermore, the pixel array should be arranged like a square grid or a honeycomb. The invention can be applied irrespective of the type of the CCD image sensor.

In the foregoing, it is further preferable that there should be provided means for distinguishing a voltage signal based on the unnecessary charge transferred by the electric potential well for a smear charge from a voltage signal based on the signal charge and outputting the voltage signal. By such a structure, the image signal can be distinguished from the smear signal by a signal processing circuit in the second stage of the solid-state image capturing device.

In the foregoing, it is further preferable that there should be provided discharge means for discharging the unnecessary charge transferred by the electric potential well for a smear charge in the solid-state image capturing device, and furthermore, the discharge means should be provided in a connecting portion of the vertical register and the horizontal register or at an output end of the horizontal register. By such a structure, it is possible to relieve the load of a signal processing in the second stage of the solid-state image capturing device.

In the foregoing, it is further preferable that there should be provided means for driving the vertical register with a high-speed pulse before collecting the unnecessary charge into the electric potential well for a smear charge and sweeping the unnecessary charge. By such a structure, it is possible to reduce the quantity of unnecessary charges collected in the electric potential well for a smear charge.

In order to attain the object, a smear charge removing method comprises the steps of generating an electric potential well for a smear charge before reading a signal charge picked up by the solid-state image capturing device and stored in a pixel onto a vertical register and collecting an unnecessary charge in the vertical register into the electric potential well for a smear charge, generating an electric potential well for signal charge transfer and reading the signal charge from the pixel onto the electric potential well for signal charge transfer, and transferring the electric potential well for a smear charge and the electric potential well for signal charge transfer to a horizontal register without mixing the unnecessary charge with the signal charge. By such a structure, it is possible to obtain an image in which a deterioration in picture quality is not caused by the smear.

In the foregoing, it is further preferable that the unnecessary charge transferred by the electric potential well for a smear charge should be cancelled in the solid-state image capturing device. By such a structure, it is possible to relieve the signal processing load in the second stage of the solid-state image capturing device.

In order to attain the object, a digital still camera comprises the solid-state image capturing device described above, an optical system for forming an image of an object in the solid-state image capturing device, a signal processing section for processing a signal output from the output section of the solid-state image capturing device and generating an image, and a memory section for recording the image thus generated. By such a structure, it is possible to capturing an excellent image having no smear even if a high-speed shutter is released by the electronic shutter function.

In order to achieve the object, a digital still camera comprises the solid-state image capturing device described above, an optical system for forming an image of an object in the solid-state image capturing device, a mechanical shutter for shielding the optical system, a signal processing section for processing a signal output from the output section of the solid-state image capturing device and generating an image, a memory section for recording the image thus generated, and control means for transferring a signal charge obtained by light shielding using the mechanical shutter into the solid-state image capturing device and outputting the signal charge from the solid-state image capturing device without generating the electric potential well for a smear charge, and for generating the electric potential well for a smear charge when obtaining the signal charge by an electronic shutter without using the mechanical shutter, transferring the electric potential well for a smear charge into the solid-state image capturing device and outputting the electric potential well for a smear charge from the solid-state image capturing device.

By such a structure, the smear charge is canceled when the high-speed shutter is released by an electronic shutter, and the cancellation of the smear charge is not required when the mechanical shutter is released. Consequently, it is possible to generate an image without removing the smear charge.

In the foregoing, it is preferable that there should be provided means for superposing, synthesizing and outputting a static image signal obtained by picking up an image without using the mechanical shutter and a static image signal obtained by picking up an image using the mechanical shutter continuously with the image capturing. By such a structure, it is possible to capturing a static image having a wide dynamic range.

BRIEF DESCRIPTION OF THE DRAWINGS

FIG. 2 is a schematic plan view showing a solid-state image capturing device according to a first embodiment of the invention, FIG. 5 is a schematic plan view showing a solid-state image capturing device according to a second embodiment of the invention, FIG. 15 is a diagram showing the operation timing of the digital still camera illustrated in FIG. 14, FIGS. 16(a) and 16(b) show the illustrations of a structure in which a smear charge transferred in the embodiment of the invention is discharged through an end of a vertical CCD register.

DESCRIPTION OF THE PREFERRED EMBODIMENTS

An embodiment of the invention will be described below with reference to the drawings.

Figure 1:
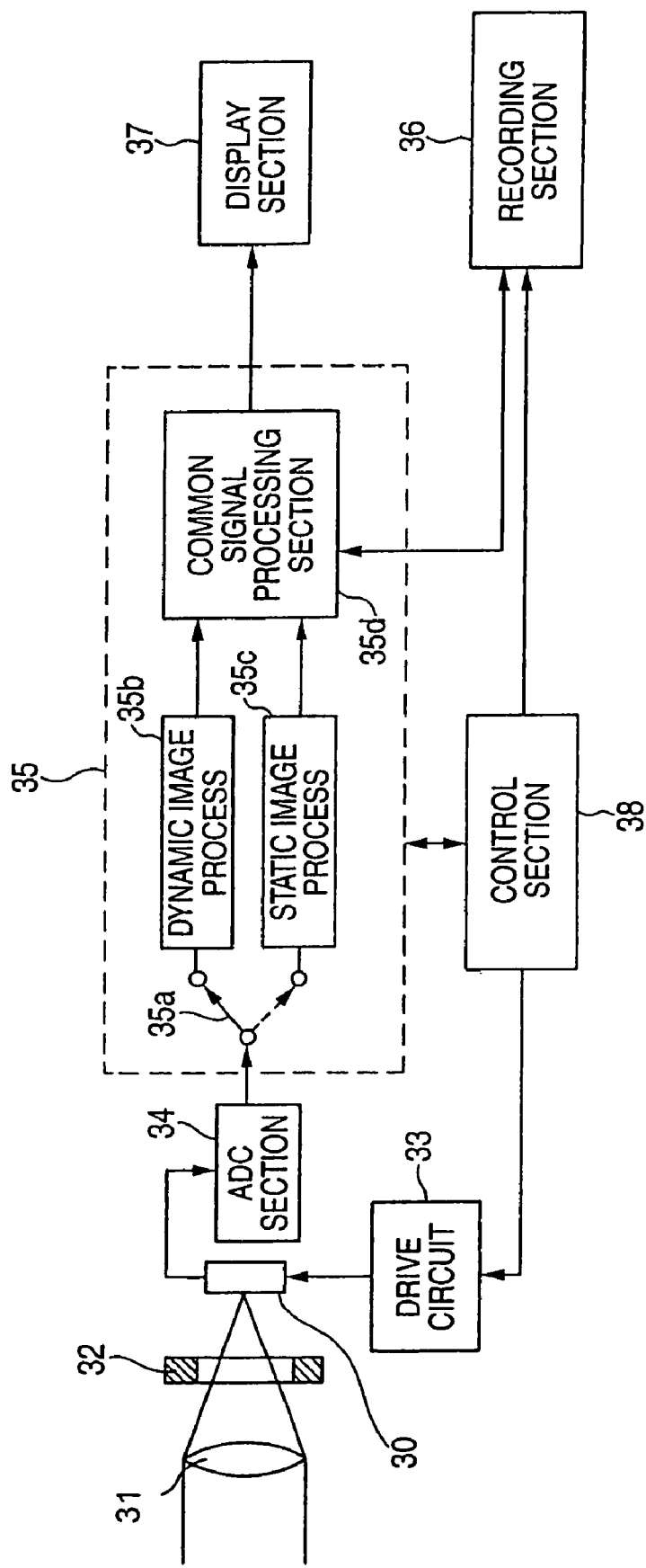
FIG. 1 is a diagram showing the structure of a digital still camera according to an embodiment of the invention.

FIG. 1 is a diagram showing the structure of a digital still camera according to the embodiment of the invention. The digital still camera comprises a solid-state image capturing device 30, an optical system 31 for forming the image of an object in the solid-state image capturing device 30, a mechanical shutter 32 provided between the solid-state image capturing device 30 and the optical system 31, a drive circuit 33 for driving the solid-state image capturing device 30, an analog/digital converting section 34 for converting an analog image signal read from the solid-state image capturing device 30 into a digital image signal, a signal processing section 35 for processing a digital image signal, a recording section 36 for storing the image signal thus processed, a liquid crystal display section 37 provided on the back face of a digital camera, used in place of a finder and capable of displaying a captured image, and a control section 38 for controlling the drive circuit 33, the signal processing section 35 and the recording section 36.

The signal processing section 35 comprises a switch 35a for switching the output destination of the digital image signal output from the analog/digital converting section 34, a dynamic image processing section 35b for processing, into a dynamic image, the digital image signal fetched through the switch 35a, a static image processing section 35c for processing, into a static image, the digital image signal fetched through the switch 35a, and a common signal processing section 35d for receiving the results of the processings of the dynamic image processing section 35b and the static image processing section 35c and carrying out another image processing.

FIG. 2 is a schematic plan view showing a solid-state image capturing device according to a first embodiment of the invention. In the solid-state image capturing device 30, a photoreceptor group includes a photoreceptor 11b having a blue filter attached thereto and a photoreceptor 11g having a green filter attached thereto which are alternately arranged in a transverse row and a photoreceptor group includes the photoreceptor 11g having the green filter attached thereto and a photoreceptor 11r having a red filter attached thereto which are alternately arranged in a transverse row, and both of the groups are alternately arranged in a vertical direction. Each of the photoreceptors 11r, 11g and 11b is arranged like a square grid.

A transfer electrode 16 is provided around each of the photoreceptors 11r, 11g and 11b, and a transfer electrode group in a vertical column which is constituted by the transfer electrode 16 forms a vertical CCD register 12 (only one column is shown in a dotted line). Hereinafter, one column in a transverse direction will be referred to as a "row" and one column in a vertical direction will be referred to as a "column".

Figure 18:
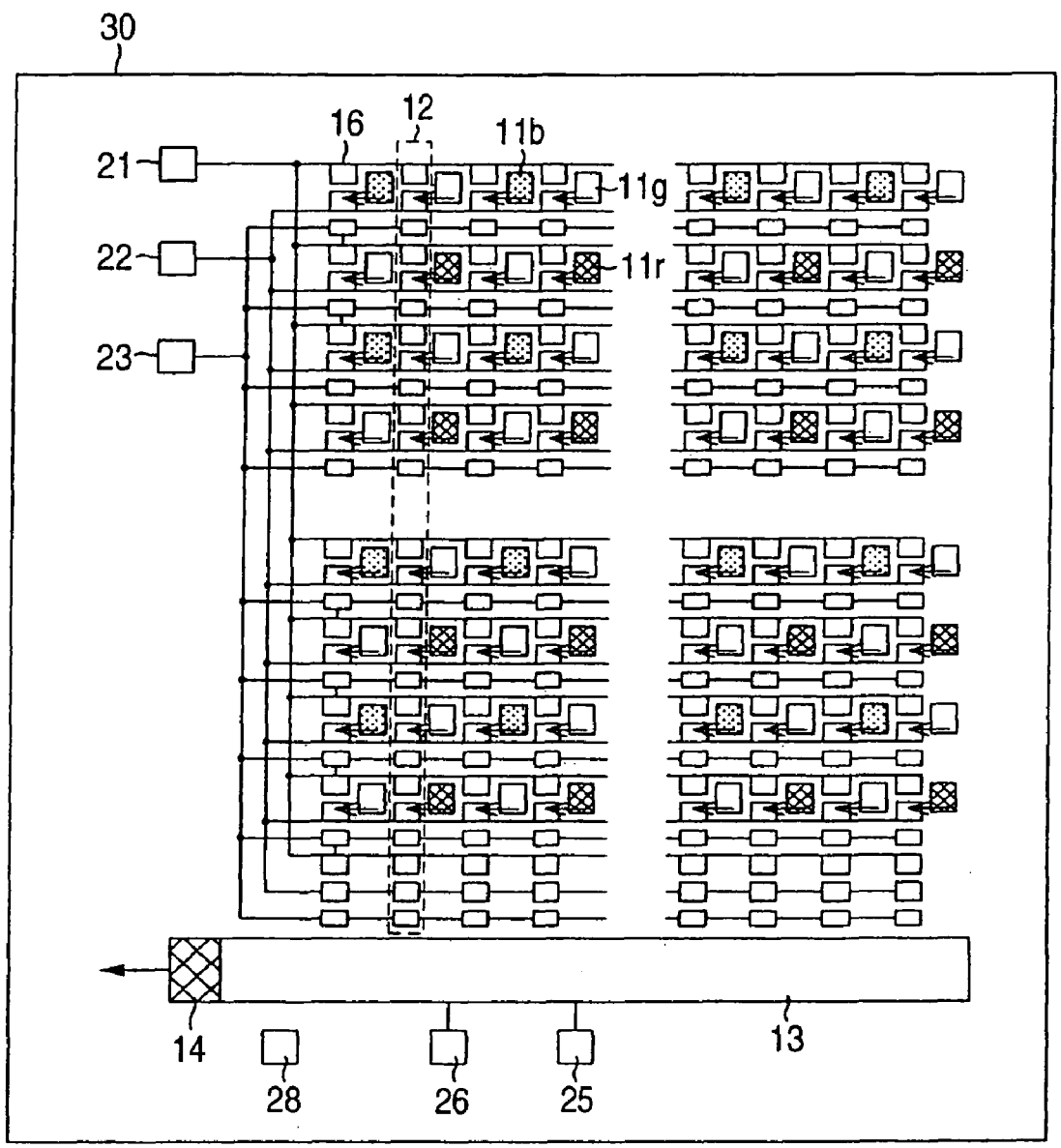
FIG. 18 is a schematic plan view showing a conventional solid-state image capturing device.
Figure 19:
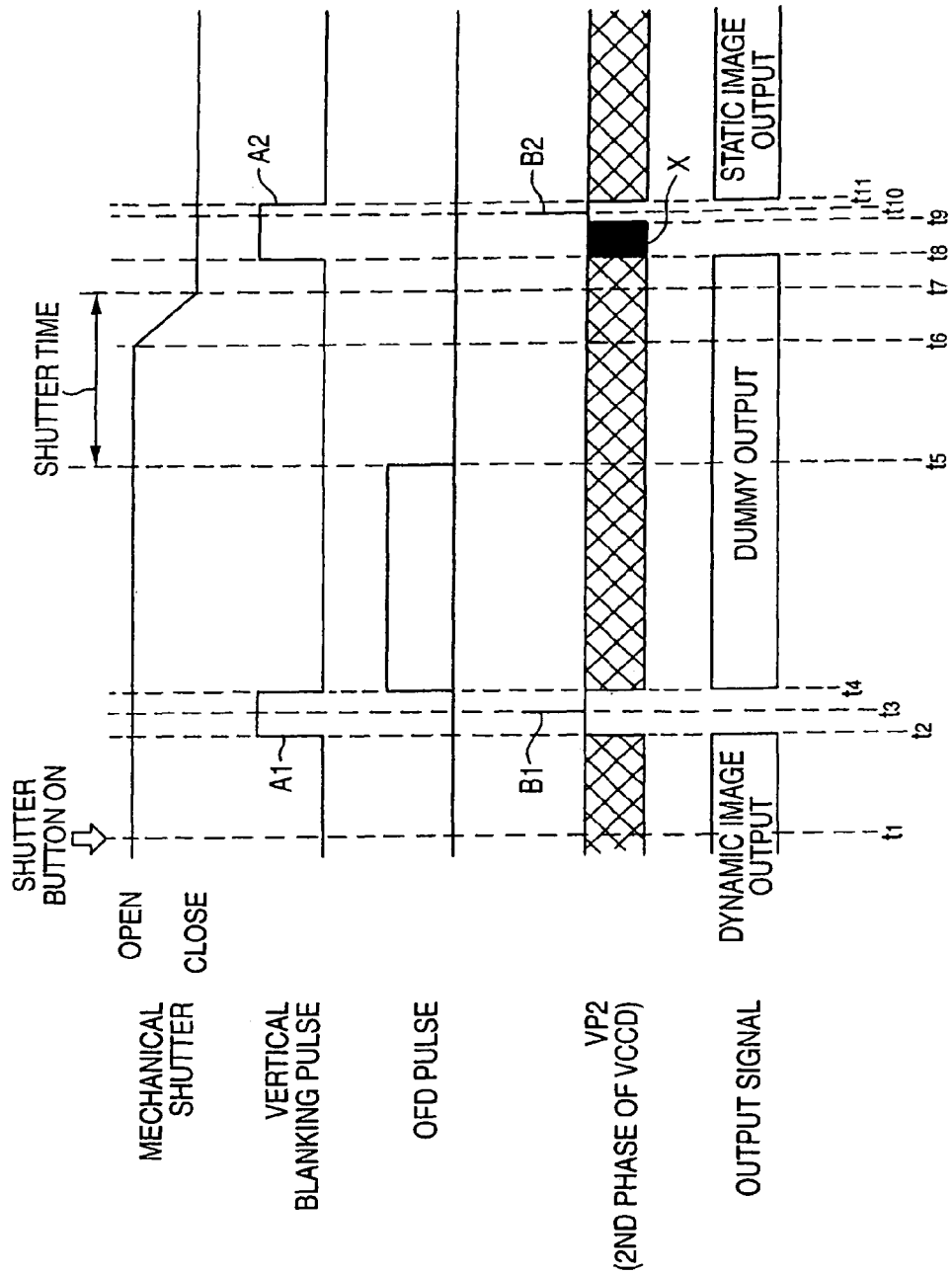
FIG. 19 is a diagram showing an operation timing for obtaining an image picked up by a low-speed shutter in the solid-state image capturing device illustrated in FIG. 18.
Figure 20:
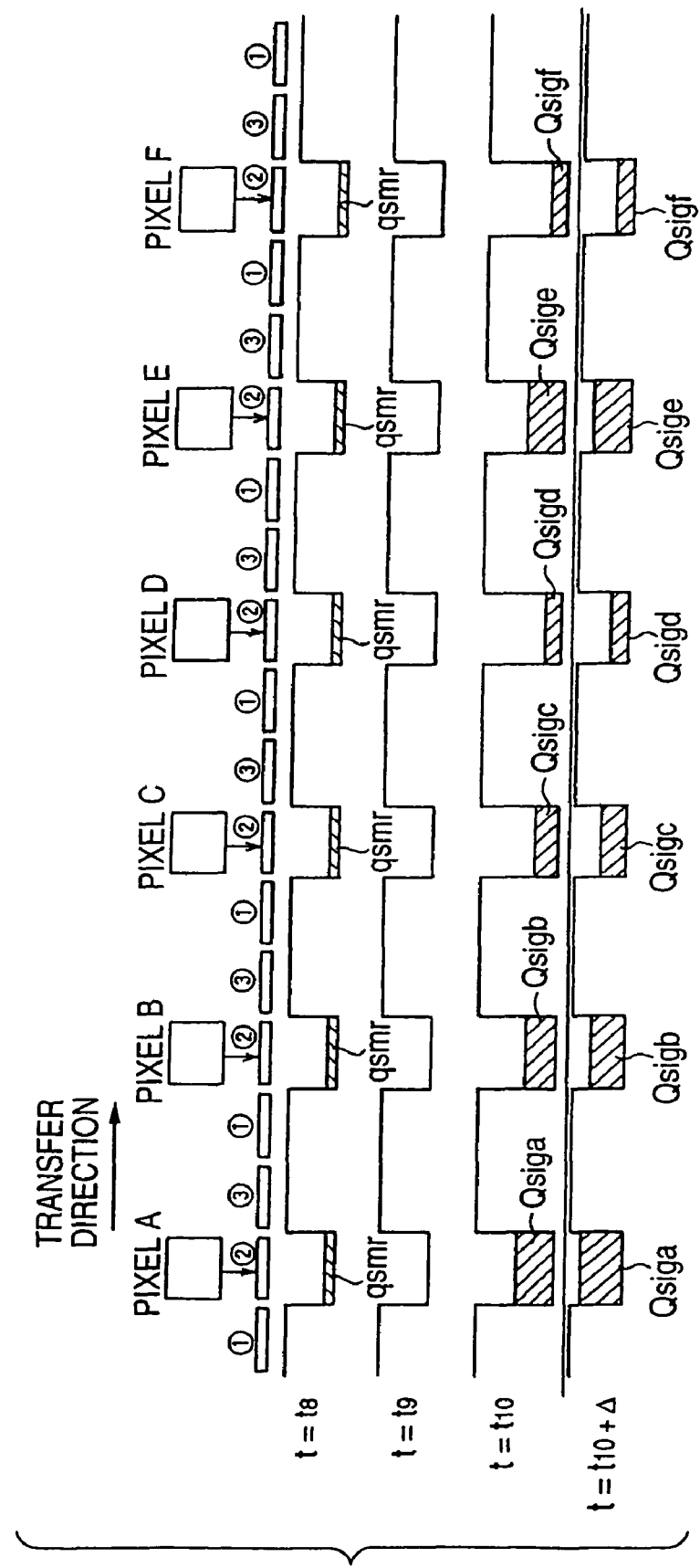
FIG. 20 is a timing chart for explaining a transfer method in the solid-state image capturing device shown in FIG. 18.

The conventional solid-state image capturing device 10 described with reference to FIG. 18 is provided the three electrode terminals 21, 22 and 23 in order to 3-phase drive the vertical CCD register 12. In the solid-state image capturing device 30 according to the embodiment, nine electrode terminals 301 to 309 are provided in order to 9-phase drive the vertical CCD register 12.

In the transfer electrode 16, a transfer electrode 16 group in a transverse row which is arranged in the upper side portion of the photoreceptor group in a first row is connected to an electrode terminal 301, a transfer electrode 16 group in a transverse column which is arranged in the lower side portion of the photoreceptor group in the first row is connected to an electrode terminal 302, and a transfer electrode 16 group in a transverse row which is provided between the photoreceptor group in the first row and the a photoreceptor group in a second row is connected to an electrode terminal 303.

Furthermore, a transfer electrode 16 group in a transverse row which is arranged in the upper side portion of the photoreceptor group in the second row is connected to an electrode terminal 304, and so forth, and a transfer electrode 16 group in a transverse row which is provided between a photoreceptor group in a third row and a photoreceptor group in a fourth row is connected to an electrode terminal 309, and a transfer electrode 16 group in a transverse row which is arranged in the upper side portion of the photoreceptor group in the fourth row is connected to the electrode terminal 301 again. Such a connecting structure is repeated. When a voltage is applied to a certain electrode terminal, the same voltage is applied to all the transfer electrodes connected to the electrode terminal in the same timing.

In the case in which the image signals (the received charges of the photoreceptors 11r, 11g and 11b) picked up by each pixel of the solid-state image capturing device 30 are to be read, a reading potential (a reading pulse) is applied to each reading gate which is not shown and the received charges (the signal charges) of the photoreceptors 11r, 11g and 11b are read onto the corresponding transfer electrode 16 of the vertical CCD register 12 as shown in arrows on the photoreceptors 11r, 11g and 11b.

When a transfer pulse for 9-phase driving is applied to each of the electrode terminals 301 to 309, the signal charge is transferred in the direction of the horizontal CCD register 13 and a transfer pulse is applied to the electrode terminals 25 and 26 of the horizontal CCD register 13. Consequently, the signal charge is output from an output section 14 of the horizontal register 13. Also in the embodiment, an electrode terminal 28 for the application of an OFD pulse is provided.

Figure 3:
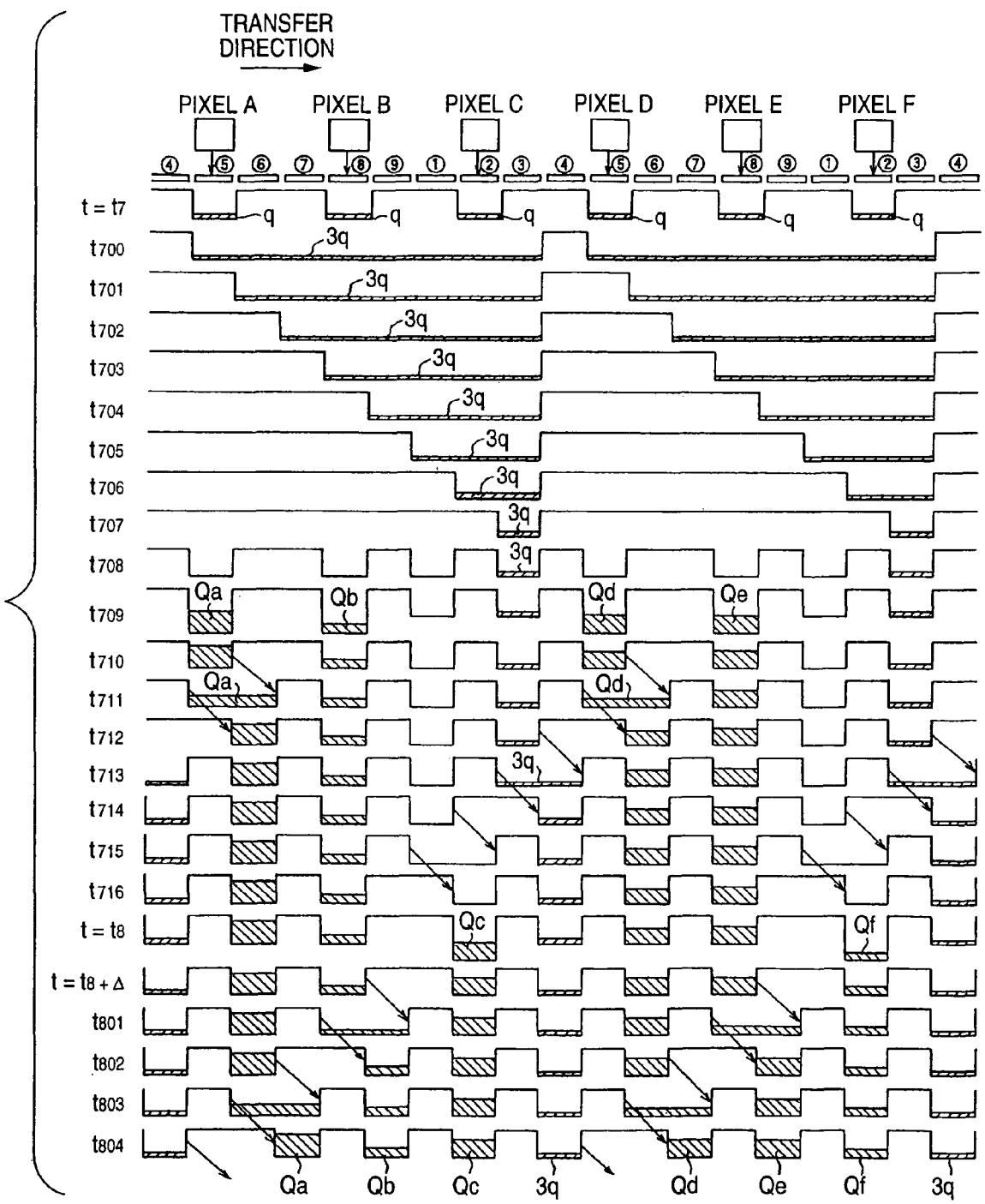
FIG. 3 is a timing chart for explaining a transfer method in the solid-state image capturing device shown in FIG. 2.
Figure 4:
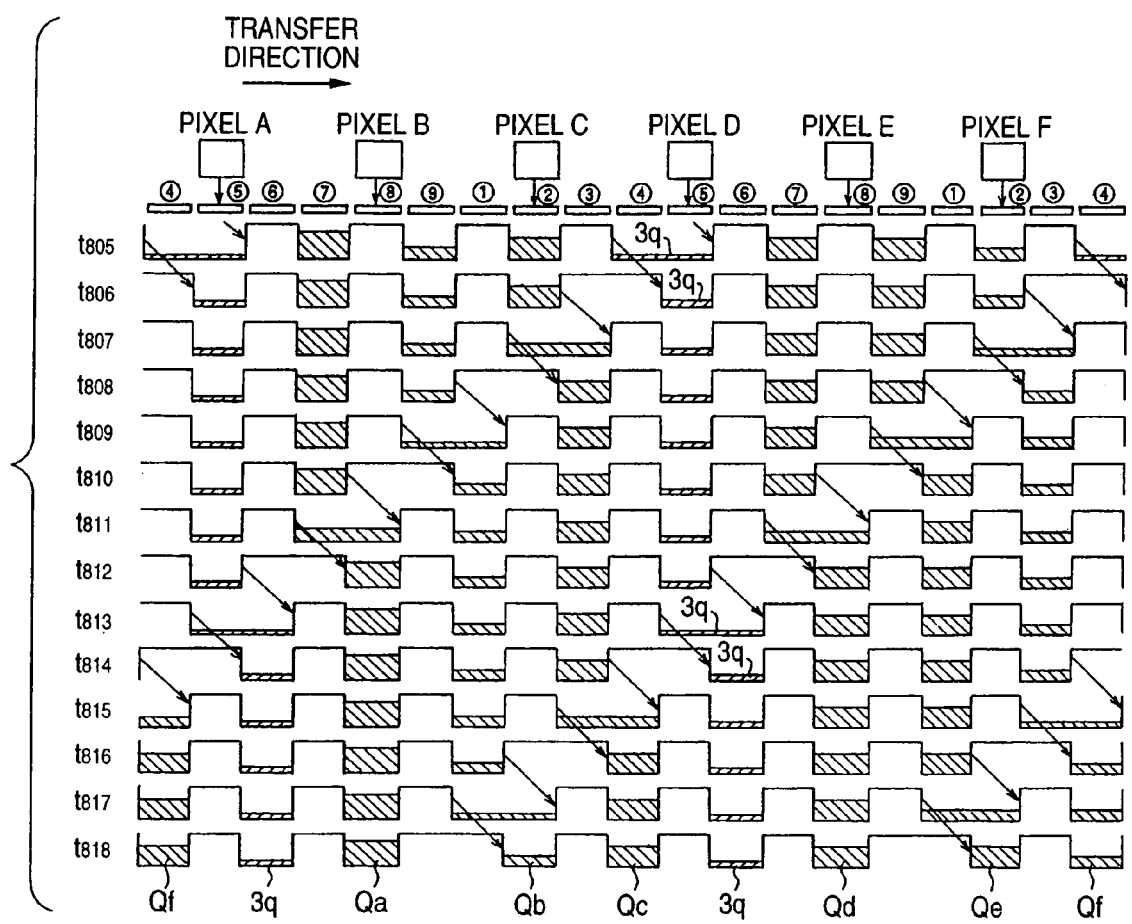
FIG. 4 is a timing chart which is connected to FIG. 3.
Figure 21:
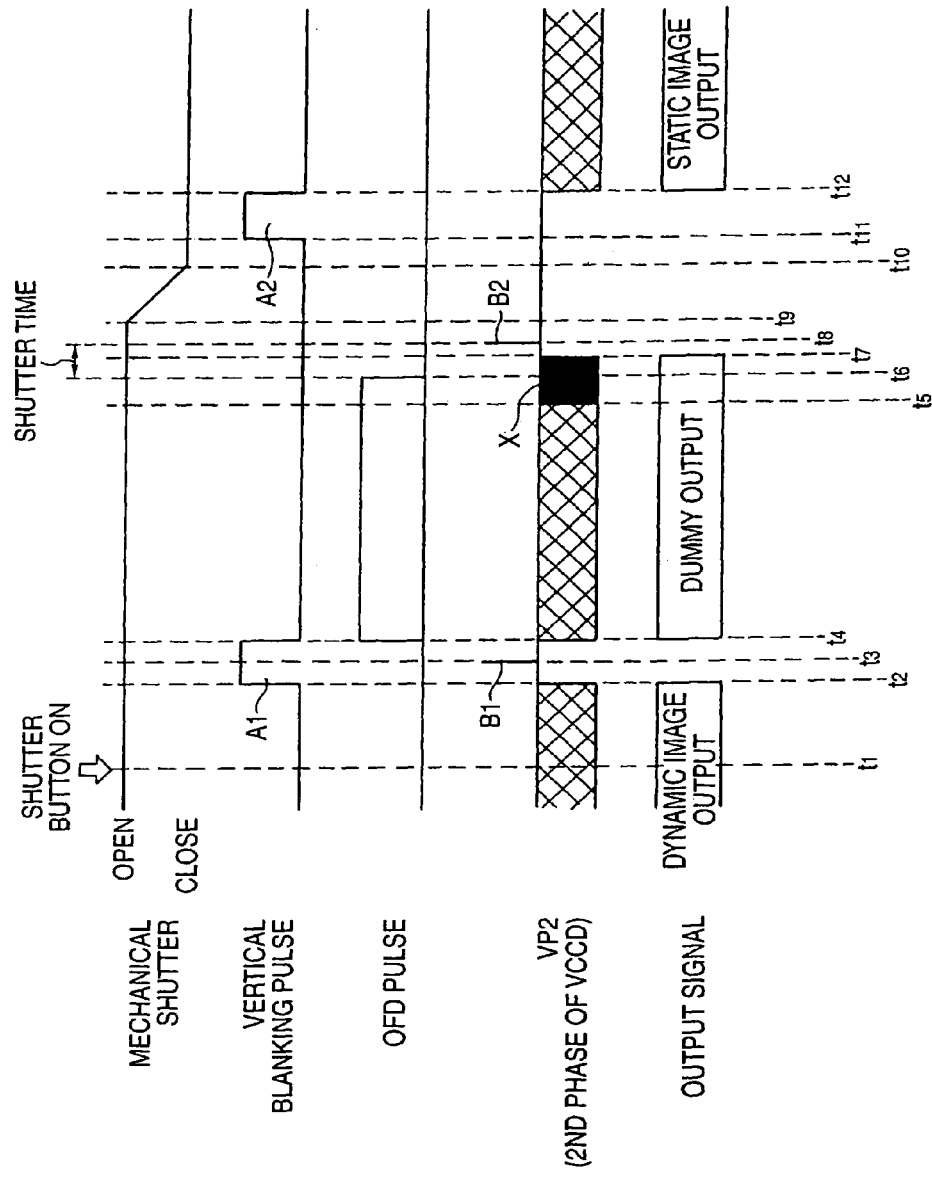
FIG. 21 is a diagram showing an operation timing for obtaining an image picked up by a high-speed shutter in the solid-state image capturing device illustrated in FIG. 18.
Figure 22:
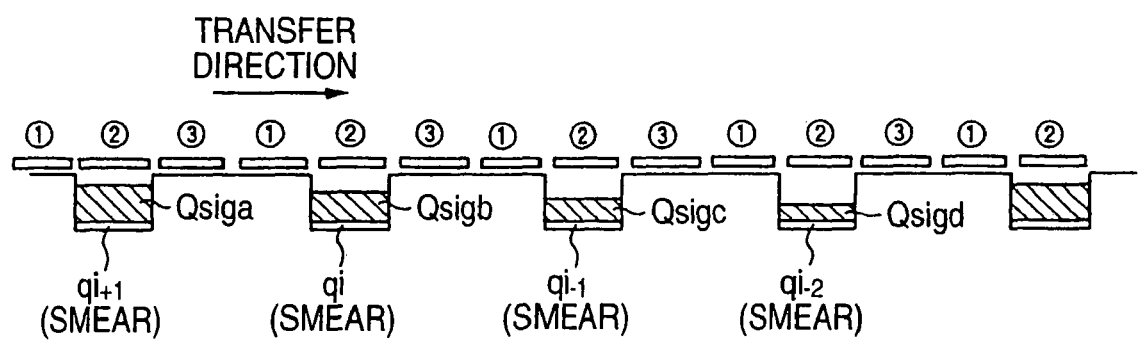
FIG. 22 is a view for explaining a problem in the solid-state image capturing device shown in FIG. 18.

FIGS. 3 and 4 are timing charts for explaining the transfer method of the vertical CCD register 12. In the drawing, an encircled figure represents a last one digit of the designation of each of the electrode terminals 301 to 309. By cyclically applying a transfer potential (for example, pulses having a high level (0 V) and a low level (–8 V) to each electrode terminal, an electric potential well is moved along the vertical CCD register 12 and signal charges Qi, Qi–1, . . . constituting the image signals are transferred to the horizontal register 13. An operation timing is the same as that shown in FIG. 21 and FIGS. 3 and 4 show a state obtained after a timing t7 in which the sweeping pulse X is ended.

In the case in which a high-speed shutter is released, the sweeping is carried out in a state in which a mechanical shutter is opened as described above. Therefore, a smear charge q enters an electric potential well in the timing t7 in which the sweeping is ended by the sweeping pulse X. In the timing t7 in which the sweeping is ended, an electric potential having a high level is applied to electrodes ②, ⑤ and ⑧ so that the electric potential well is formed.

In the embodiment, the smear charges in each electric potential well which remain in the timing t7 are collected into one place and the collected smear charges are transferred and discharged by the vertical CCD register 12 before they are transmitted into the horizontal CCD register 13 or at the output end of the horizontal CCD register 13.

In the embodiment, all but the electrode □ are set to be electric potentials having a high level in a timing t700 immediately after the timing t7. Consequently, the electric potential well is expanded to eight electrodes and three smear charges are united. Subsequently, an electric potential having a lower level is sequentially applied to the electrodes ⑤, ⑥, ⑦, ⑧, ⑨, ① and ② in timings t701, . . . , t707 to gradually reduce the width of the electric potential well, and three smear charges 3q are collected into an electric potential well by the electrode ③.

In a next timing t708, an electric potential having a high level is applied to the electrodes ⑤, ⑧ and ① as well as the electrode ③ to form an electric potential well for signal charge transfer. In a next reading timing t709 (corresponding to a reading pulse B2 for a first phase (FIG. 21 shows a reading pulse B2 for a second phase)), signal charges Qa, Qb, Qd and Qe of pixels A, B, D and E are read onto the electric potential well.

The reading is carried out by applying a reading potential of +16 V to a corresponding reading gate, for example. For this reason, the depth of a corresponding electric potential well for signal charge transfer is great. In the timing t708, the electric potential well for signal charge transfer formed in the position of the electrode ① has not been moved to the positions of the pixels C and F. In a timing t709, therefore, the signal charges are not read from the pixels C and F (the signal charges are read in a timing t8 of the reading pulse B2 for a second phase which will be described below).

After the signal charges Qa, Qb, Qd and Qe are read, the depth of the electric potential well is returned to an original depth (a timing t710), and subsequently, the electric potential well is transferred by a method referred to as accordion transfer. More specifically, in a timing t711, the electrode ⑥ is set to be an electric potential having a high level and the widths of the electric potential wells holding the signal charges Qa and Qd are expanded into two electrodes respectively, and an electric potential having a low level is applied to the electrode ⑤ in a next timing t712. Consequently, the widths of the electric potential wells holding the signal charges Qa and Qd are reduced to one electrode. As a result, the electric potential wells holding the signal charges Qa and Qd advance corresponding to one electrode.

In a timing t713, moreover, an electric potential having a high level is applied to the electrode ④ so that the width of the electric potential well for smear charge transfer is expanded into two electrodes. In a next timing t714, an electric potential having a low level is applied to the electrode ③ so that the width of the electric potential well for smear charge transfer is reduced to one electrode. As a result, the electric potential well for smear charge transfer advances corresponding to one electrode.

Similarly, the processing sequentially proceeds to timings t715 and t716, and an empty electric potential well for signal charge transfer is moved to the position of the electrode ②. In a next timing t8, the reading pulse B2 for a second phase is applied to the electrode ② so that signal charges Qc and Qf of the pixels C and F are moved from the photoreceptor to the electric potential well. In a state of a timing t8+Δ immediately after the reading, the depth of a corresponding electric potential well is returned to an original state and all the signal charges of each photoreceptor of the solid-state image capturing device 30 are read onto the vertical CCD register 12. As shown in timings t801 to t818 in FIGS. 3 and 4, each electric potential well for signal charge transfer and an electric potential well for smear charge transfer are sequentially transferred to the horizontal CCD register side, of which description will be omitted.

Thus, the vertical CCD register 12 of the solid-state image capturing device is driven in a multiphase. Consequently, an electric potential well which can be used specially for smear charge transfer can be provided and the smear charges are collectively transferred into the electric potential well for smear charge transfer. Consequently, the smear charge can be discharged as will be described below in detail. Thus, it is possible to obtain an excellent image having no smear.

FIG. 5 is a schematic plan view showing a solid-state image capturing device according to a second embodiment of the invention. A solid-state image capturing device 40 has a structure which is referred to as a so-called honeycomb type, and comprises a photoreceptor group including a photoreceptor 11b having a blue filter attached thereto and a photoreceptor 11r having a red filter attached thereto which are alternately arranged in a transverse row and a photoreceptor group including the photoreceptor 11g having the green filter attached thereto which are alternately arranged in a vertical direction with a ½ pitch.

In the drawing, the photoreceptors 11r, 11g and 11b are displayed in squares inclined at 45 degrees. In the solid-state image capturing device 40, a transfer electrode 16 is provided along each side of each square of the photoreceptors 11r, 11g and 11b and one transverse row H1 of the transfer electrode is divided in a channel stop corresponding to each photoreceptor, and the same electric potential is applied to the electrode group H1 in the transverse row in the same timing.

The solid-state image capturing device 40 according to the embodiment carries out 8-phase driving. Therefore, the electrode group in each transverse row repeats . . . , H7, H8, H1, H2, H3, H4, H5, H6 . . . . An electrode terminal 401 is connected to the electrode group H1, an electrode terminal 402 is connected to the electrode group H2, an electrode terminal 403 is connected to the electrode group H3, . . . , and an electrode terminal 408 is connected to the electrode group H8 (that is, an electrode group Hx is connected to an electrode terminal 40x).

The transfer electrode 16 provided around each of the photoreceptors 11r, 11g and 11b is also arranged in a vertical direction and a transfer electrode group 12 arranged in the vertical direction (only one column is shown in a dotted line) constitutes a vertical CCD register 12. When a reading potential (a reading pulse) is applied to a reading gate which is not shown in order to read image signals picked up by the solid-state image capturing device 40 (the received charges of the photoreceptors 11r, 11g and 11b), the received charges (signal charges) of the photoreceptors 11r, 11g and 11b are read onto the corresponding transfer electrode of the vertical CCD register 12 as shown in an arrow on each of the photoreceptors 11r, 11g and 11b.

A transfer potential (a transfer pulse) is sequentially applied to each of the electrode terminals 401 to 408 so that a received charge is transferred in a vertical direction (a downward direction in the example shown in the drawing) and a signal charge is transferred through a transfer electrode 17 to a horizontal CCD register 13 provided in the lowest stage. The signal charge is transferred in a horizontal direction by the application of the transfer pulse to electrode terminals 25 and 26 and is output from an output section 14 of the horizontal register 13 as shown in an arrow 27. Moreover, the solid-state image capturing device 40 is also provided with an electrode 28 for OFD pulse application.

Figure 6:
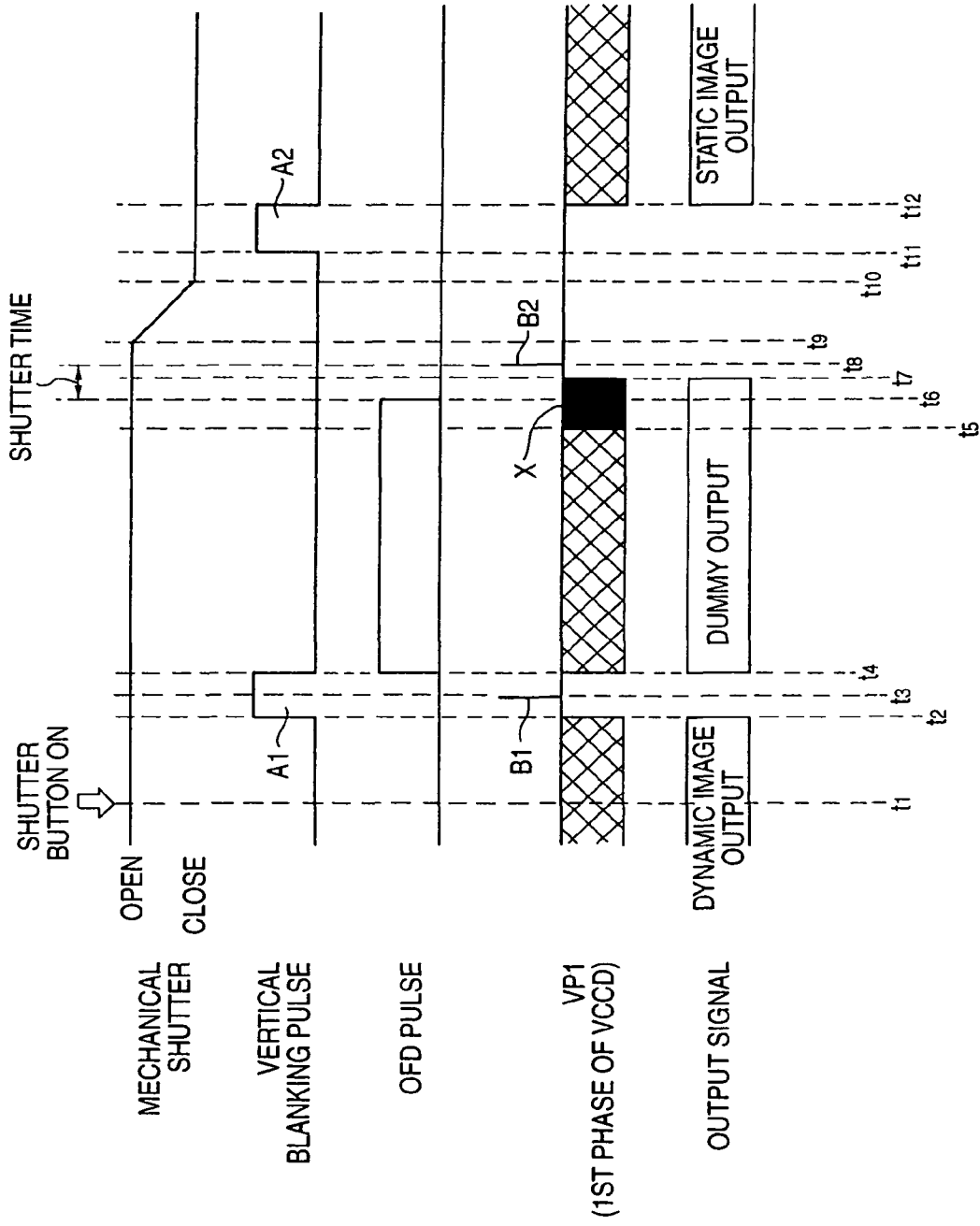
FIG. 6 is a diagram showing the operation timing of the solid-state image capturing device illustrated in FIG. 5.

FIG. 6 is a diagram showing the operation timing of the solid-state image capturing device according to the second embodiment. FIG. 6 is basically the same as FIG. 21 except that a detailed pulse waveform (not shown) shown in cross-hatching is different. Also in the embodiment, a signal charge read with a reading pulse B1 is discharged as a dummy output and an image signal read with a reading pulse B2 is output for a static image.

The output for a static image is carried out after a mechanical shutter is closed, and the transfer operation of the vertical CCD register is stopped or is performed at a lower rate than an ordinary reading rate before the mechanical shutter is closed (which is the same as in the first embodiment). Prior to the reading of a signal charge with the reading pulse B2, electric charges in the vertical CCD register 12 is quickly swept with a sweeping pulse X and electric charges stored in the photoreceptors 11r, 11g and 11b are zero cleared with an OFD pulse in the same manner as described above.

Figure 7:
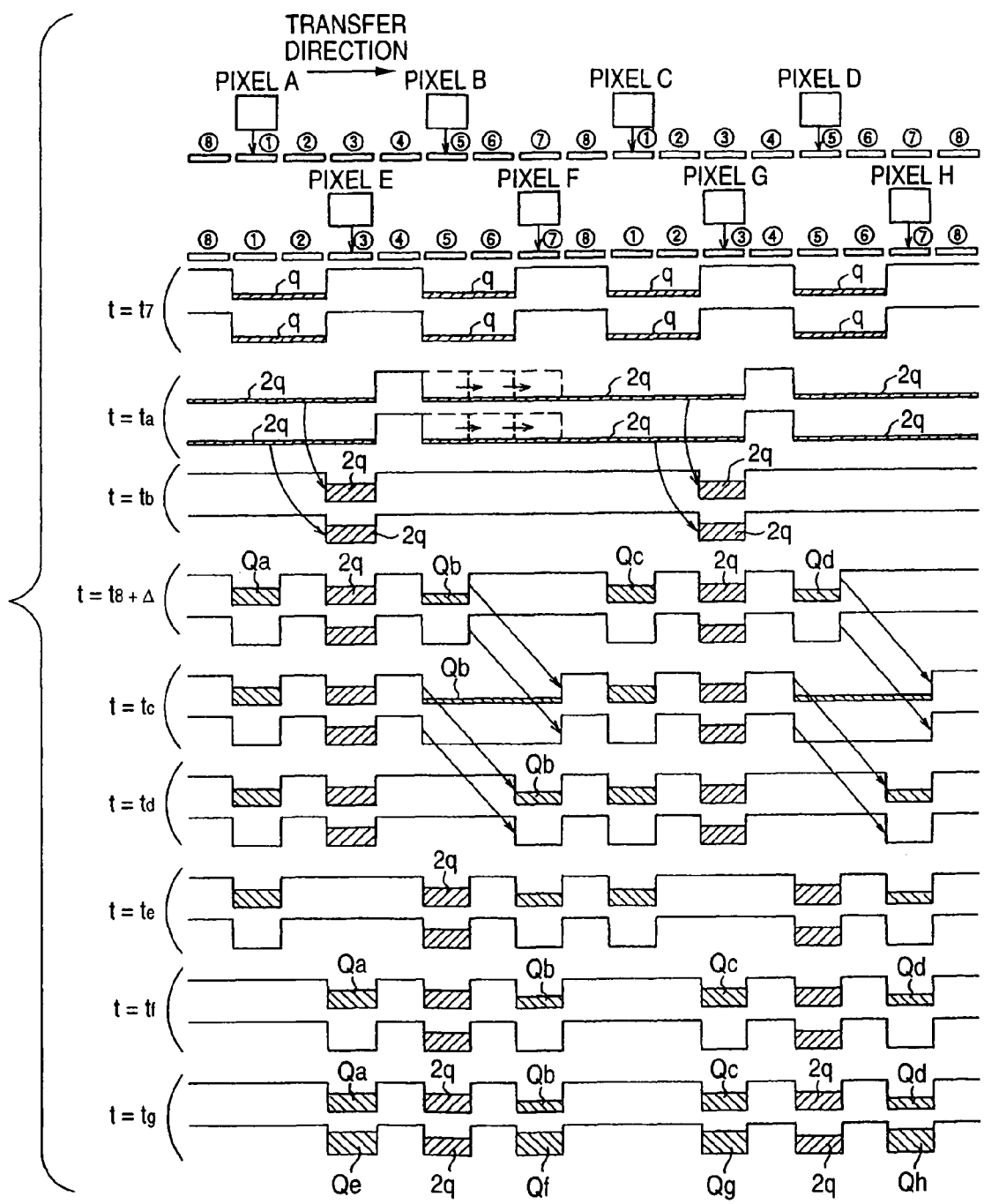
FIG. 7 is a timing chart for explaining a transfer method in the solid-state image capturing device shown in FIG. 5.

FIG. 7 is a timing chart for explaining the transfer method of the solid-state image capturing device according to the second embodiment. In the drawing, the encircled numbers represent the last ones digit of each of the electrode terminals 401 to 408. Moreover, pixels A, B, C and D represent photoreceptors in odd-numbered rows in FIG. 5 which are adjacent to the vertical CCD register 12, and similarly, pixels E, F, G and H represent photoreceptors in even-numbered rows of FIG. 5.

In the embodiment, signal charges Qa, Qb, Qc and Qd of the pixels A, B, C and D in the odd-numbered rows (the photoreceptors 11r and 11b for blue and red colors in FIG. 5) are read and transferred onto an electric potential well formed in the vertical CCD register 12 in the even-numbered column (since the vertical CCD register 12 in FIG. 5 is provided in a third column, both sides are second and fourth columns), and signal charges Qe, Qf, Qg and Qh of pixels E, F, G and H in the even-numbered rows (the photoreceptor 11g for a green color in FIG. 5) are read and transferred onto the vertical CCD register 12 in the odd-numbered column.

In each timing shown in FIG. 7, the timing chart of the electric potential well transferred through the vertical CCD register in the even-numbered column is shown in each upper stage and the timing chart of the electric potential well transferred through the vertical CCD register in the odd-numbered column is shown in each lower stage.

Also in the solid-state image capturing device 40 according to the embodiment, smear charges remaining at the end point of a sweeping pulse X are collected into one electric potential well and only the collected smear charges are transferred separately from the signal charge and are finally cancelled. Consequently, an image having no smear is obtained. More specifically, in the embodiment, a smear charge q remaining in an end timing t7 of the sweeping pulse X is collected into an electric potential well corresponding to one electrode by first setting all but the electrode ④ to an electric potential having a high level (a timing ta), collecting them every two smear charges 2q and then applying an electric potential having a low level to the electrodes ⑤, ⑥, ⑦, . . . in this order (a timing tb).

In the same manner as in the first embodiment, an electric potential well for signal charge transfer is formed (not shown) and the signal charges of the pixels A, B, C and D are read, and the accordion transfer is started by each vertical CCD register from a timing t8+Δ. More specifically, the electrodes ⑥ and ⑦ are set to have a high level in a timing tc, thereby increasing the width of a corresponding electric potential well, and the electrodes ⑤ and ⑥ are sequentially set to have a low level in a timing td, thereby reducing the width of a corresponding electric potential well into one electrode. As a result, the electric potential well is caused to advance corresponding to two electrodes.

Thus, the electric potential well transfer of each of the vertical CCD registers 12 in the even-numbered and odd-numbered columns is caused to progress at the same time. When an empty electric potential well for signal charge transfer in the odd-numbered column comes to the positions of the pixels E, F, G and H, the signal charges Qe, Qf, Qg and Qh of the pixels E, F, G and H are read and the transfer of each vertical CCD register 12 is started again (a timing tg).

Consequently, the signal charges of photoreceptor groups corresponding to two rows in the transfer electrode group in a transverse row shown in FIG. 5 are transferred, and the signal processing section 35 shown in FIG. 1 can fetch the image signals of colors R, G and B together and can be subjected to an image processing. Similarly, the smear charges are also transferred in a transfer electrode group in a transverse row. Therefore, only the smear charge can be discharged together as will be described below.

Figure 8:
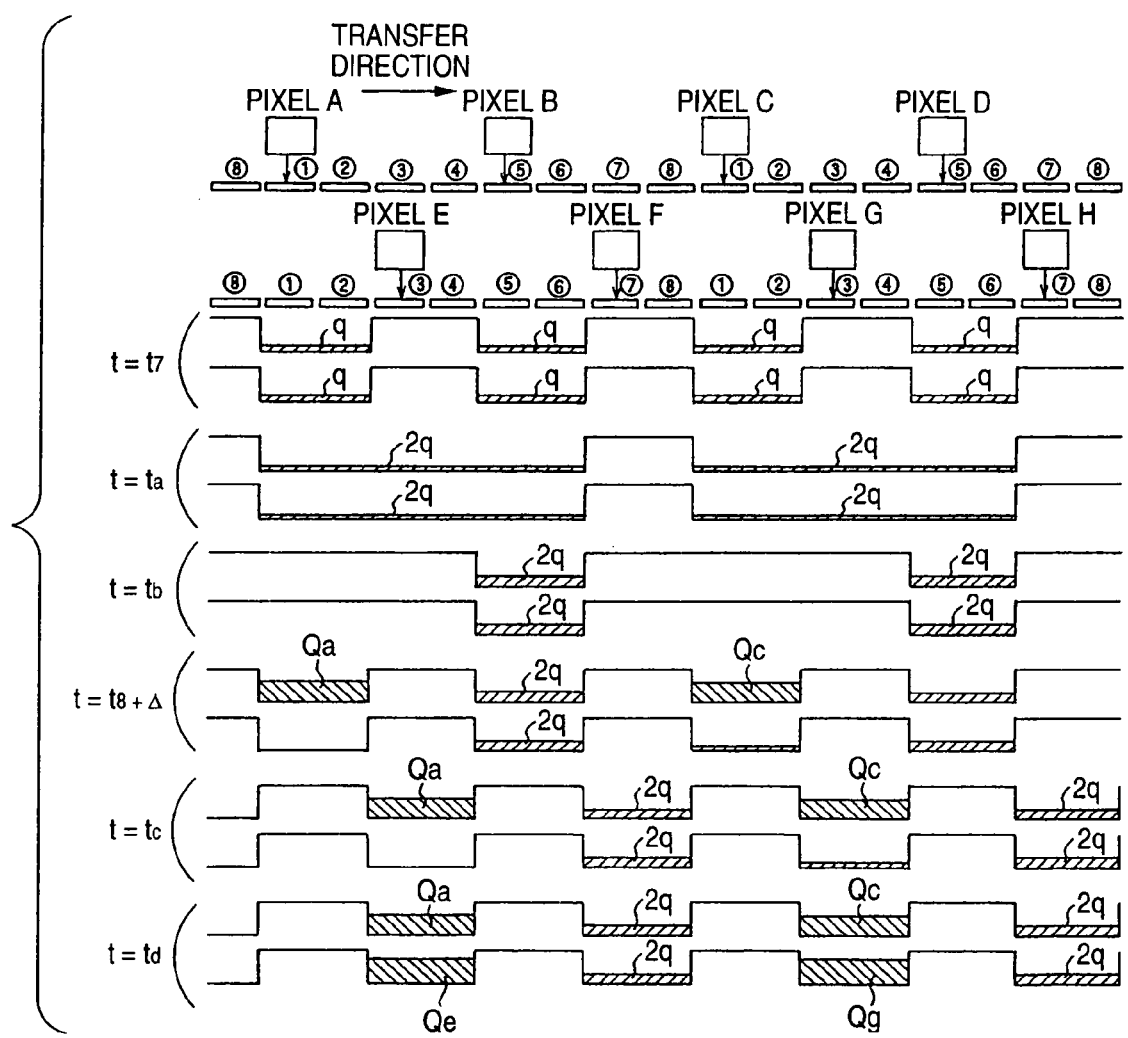
FIG. 8 is a timing chart for explaining a transfer method in a solid-state image capturing device according to a third embodiment of the invention.

FIG. 8 is a timing chart for explaining the transfer method of a solid-state image capturing device according to a third embodiment of the invention. The structure of the solid-state image capturing device according to the third embodiment is the same as that of the second embodiment shown in FIG. 5. While the second embodiment provides a progressive scanning type in which a signal charge is read from all pixels, the third embodiment provides an interlace scanning type. Also in this case, however, the smear charges are collected into one electric potential well and are thus transferred, and finally, are cancelled in the same manner.

More specifically, a smear charge q remaining in the end point (a timing t7) of the sweeping pulse X is collected into an electric potential well corresponding to two electrodes (a timing tb). Then, an electric potential well for signal charge transfer is formed and signal charges Qa and Qc of pixels A and C are read, and all the electric potential wells are caused to advance in the direction of a horizontal CCD register at the same time.

Because of the interlace scanning type, there is a space for two electrodes between the electric potential wells. For example, referring to the electric potential well of the signal charge Qa formed by setting the electrodes ① and ② in the timing t8+Δ to have a high level, the electrode ③ is set to have a high level, and at the same time, the electrode ① is set to have a low level so that an electric potential well having a width corresponding to two electrodes can be caused to advance for one electrode. An electric potential well holding an adjacent smear charge 2q can also be caused to advance for one electrode at the same time. Consequently, the transfer can be carried out at a higher speed than that in the second embodiment.

Since the interlace scanning type is used in the embodiment, the number of read pixels in a vertical direction is ½ of that of the progressive scanning type and a resolution in the vertical direction is deteriorated. The width of the electric potential well for transferring the signal charge can be taken for two electrodes. Therefore, the amount of saturation of the signal charge is doubled as compared with the second embodiment in which a signal charge is transferred through an electric potential well for one electrode. Thus, it is possible to obtain an advantage that a wide dynamic range can be obtained.

While a high-speed shutter is released by an electronic shutter in each of the embodiments, the invention can also be applied to the case in which a low-speed shutter is released by the electronic shutter function. In a digital still camera mounting a mechanical shutter, however, it is desirable that the low-speed shutter should be released by the mechanical shutter. In this case, it is preferable that the same transfer pulse as transfer pulses for first to fourth phases should be applied to electrode terminals for fifth to eighth phases of the vertical CCD register and only a signal charge should be transferred without generating an electric potential well for a smear charge. Consequently, it is possible to obtain an image of high picture quality when releasing the low-speed shutter.

Figure 9:
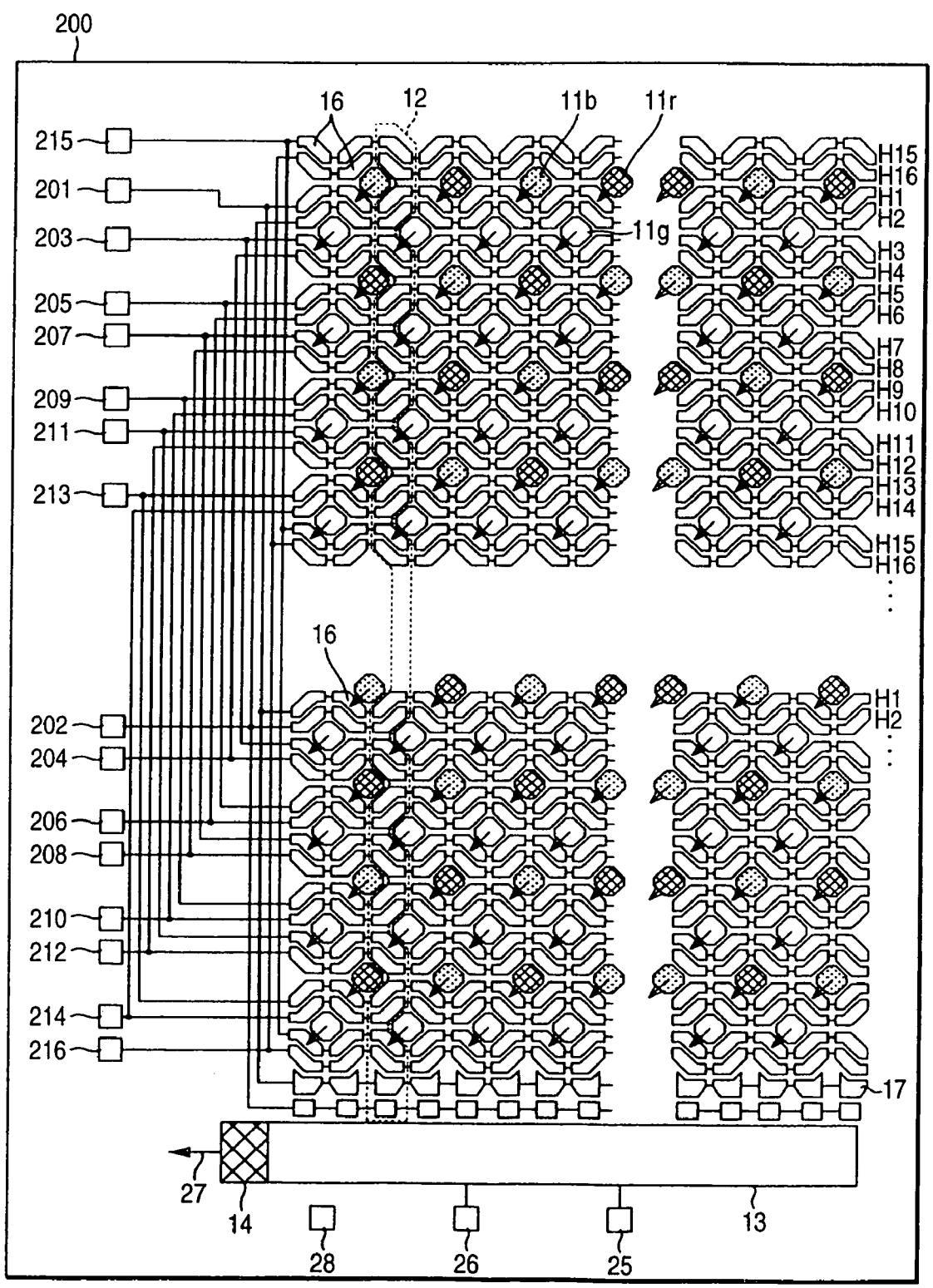
FIG. 9 is a schematic plan view showing a solid-state image capturing device according to a fourth embodiment of the invention.

FIG. 9 is a schematic plan view showing a solid-state image capturing device according to a fourth embodiment of the invention. A solid-state image capturing device 200 is almost the same as the solid-state image capturing device 40 (FIG. 5) according to the second embodiment except that the number of electrode terminals to which a transfer potential is applied and a connecting structure thereof are different.

In the embodiment, 16 electrode terminals 201 to 216 are provided for applying a transfer potential to a vertical CCD register 12 in order to 16-phase drive the vertical CCD register 12 and are connected to electrode groups H1 to H16 in a horizontal line, respectively. The electrode terminals 201 to 216 are connected to the electrode groups H1 to H16 in which the last two digits of the designations (figures) of the electrode terminals are coincident with figures after "H".

Figure 10:
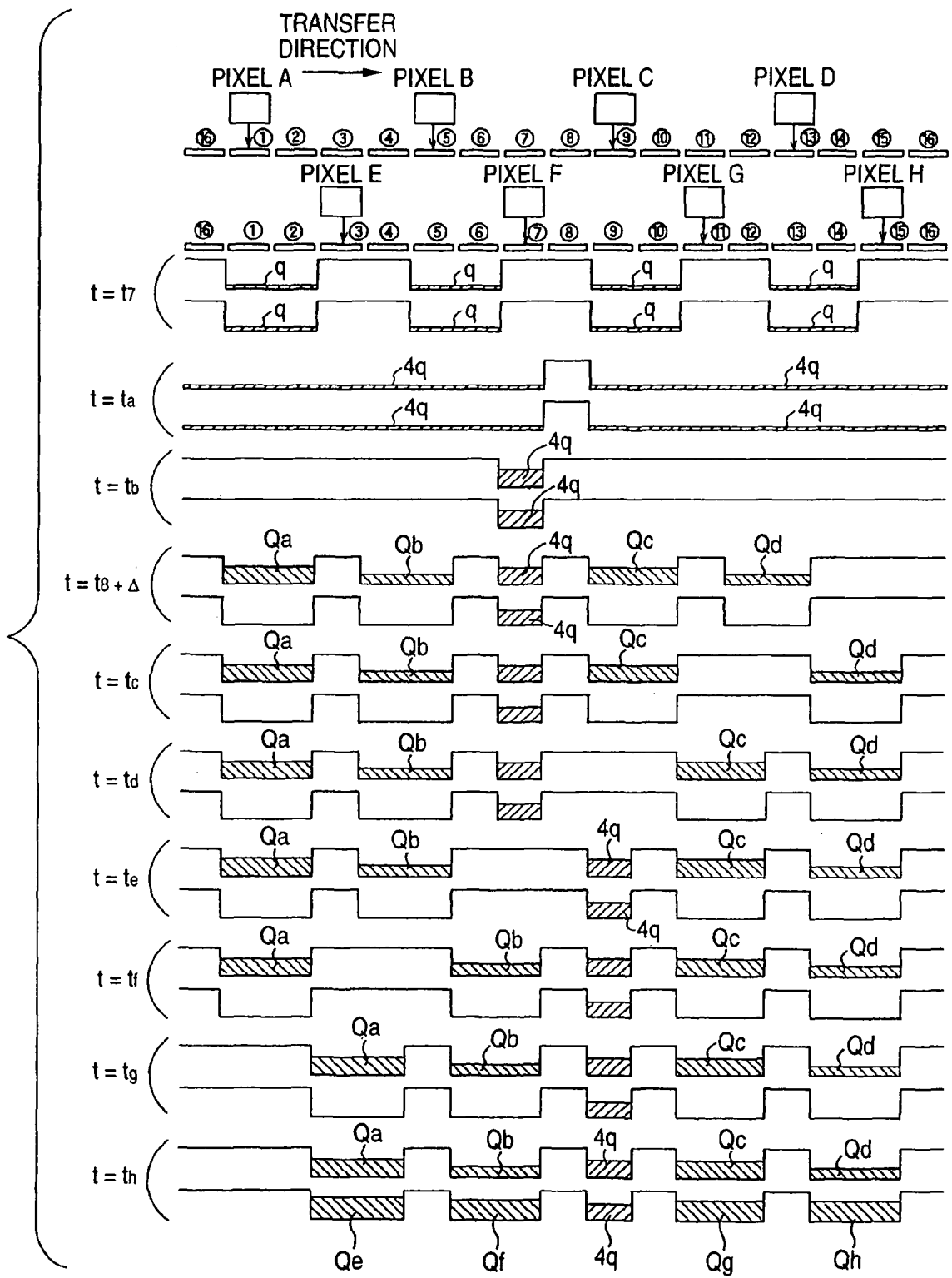
FIG. 10 is a timing chart for explaining a transfer method in the solid-state image capturing device shown in FIG. 9.

FIG. 10 is a timing chart for explaining a transfer method in the solid-state image capturing device according to the fourth embodiment. In the second embodiment described with reference to FIG. 7, the width of the electric potential well for transferring a signal charge is set to one electrode. For this reason, the amount of saturation of the signal charge is a half of that in the third embodiment (FIG. 8). On the other hand, the fourth embodiment is characterized in that a progressive scanning type is used and the width of the electric potential well for signal charge transfer is set to two-electrodes.

Also in the embodiment, smear charges remaining in each electric potential well in the end point (a timing t7) of a sweeping pulse X are collected into one electric potential well (a timing tb). As described above, in order to increase the amount of saturation of the signal charge, the width of the electric potential well for signal charge transfer is set to two electrodes and an electric potential well dedicated to smear charge transfer has a width of one electrode. Differently from the second embodiment, the electric potential well for signal charge transfer and the electric potential well for smear charge transfer are transferred through accordion transfer and the width of the electric potential well for signal charge transfer can be maintained corresponding to two electrodes during the transfer. Other respects are the same as in the second embodiment.

According to the embodiment, an image having a high resolution is obtained because of the progressive scanning type. In addition, the signal charge is transferred through the electric potential well for two electrodes to be the electric potential well for signal charge transfer. Consequently, it is possible to obtain an image having a wide dynamic range.

Figure 11:
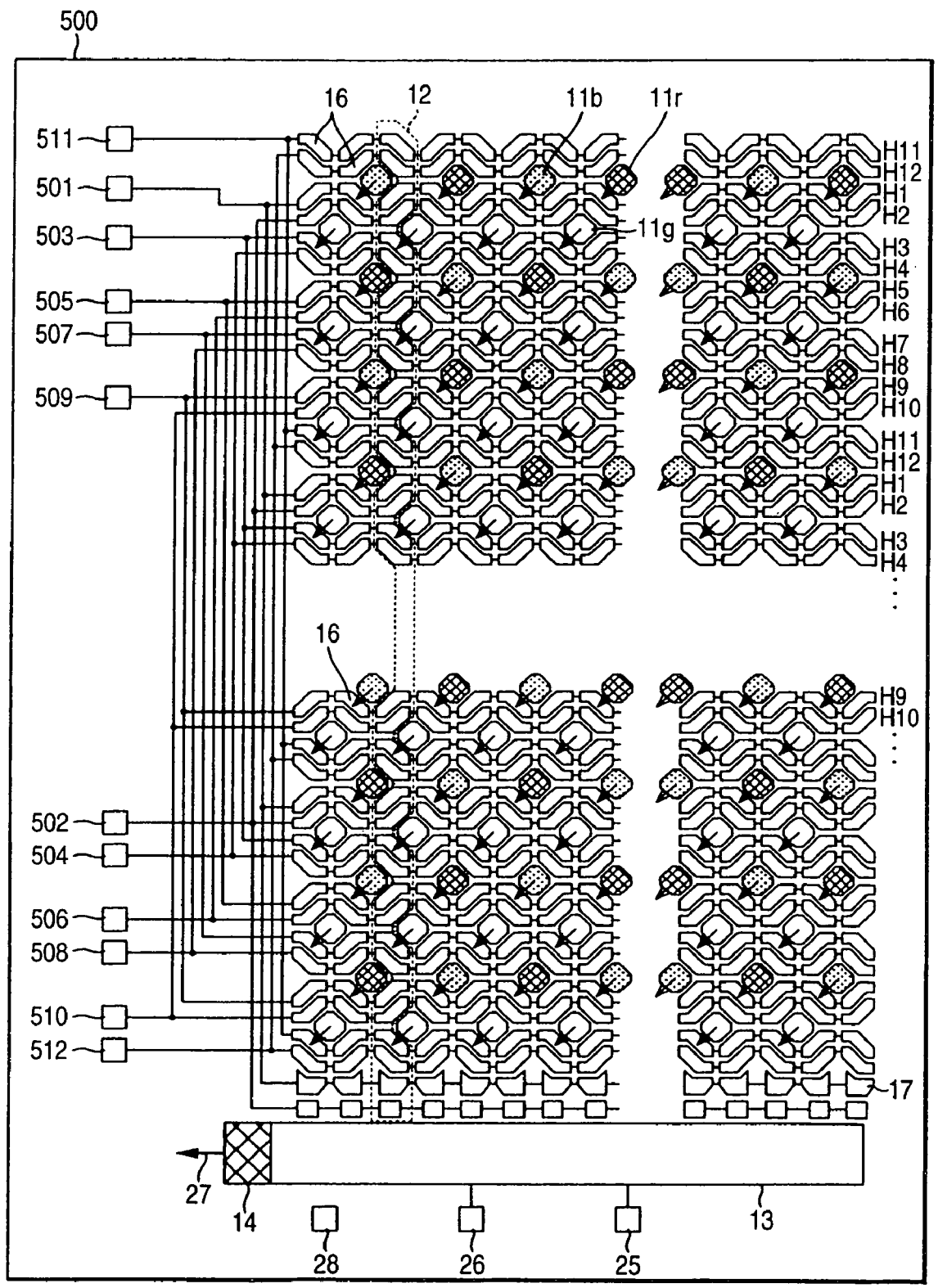
FIG. 11 is a schematic plan view showing a solid-state image capturing device according to a fifth embodiment of the invention.

FIG. 11 is a schematic plan view showing a solid-state image capturing device according to a fifth embodiment of the invention. A solid-state image capturing device 500 is almost the same as the solid-state image capturing device 200 (FIG. 9) according to the fourth embodiment except that the number of electrode terminals for applying a transfer potential and a connecting structure thereof are different.

In the embodiment, 12 electrode terminals 501 to 512 are provided for applying a transfer potential to a vertical CCD register 12 in order to 12-phase drive the vertical CCD register 12 and are connected to electrode groups H1 to H2 in a horizontal line, respectively. The electrode terminals 501 to 512 are connected to the electrode groups H1 to H12 in which the last two digits of the designations (figures) of the electrode terminals are coincident with figures after "H".

Figure 12:
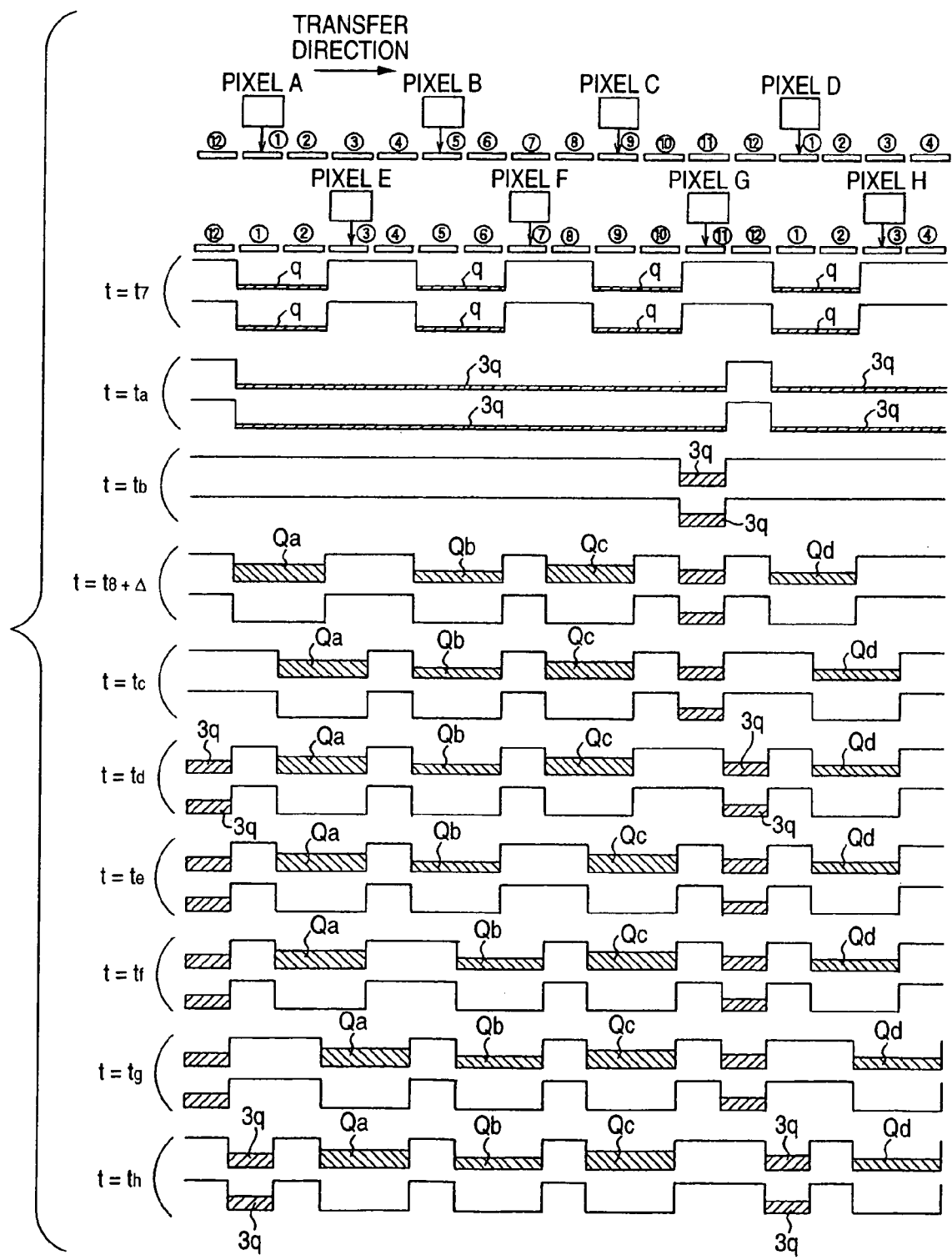
FIG. 12 is a timing chart for explaining a transfer method in the solid-state image capturing device shown in FIG. 11.
Figure 13:
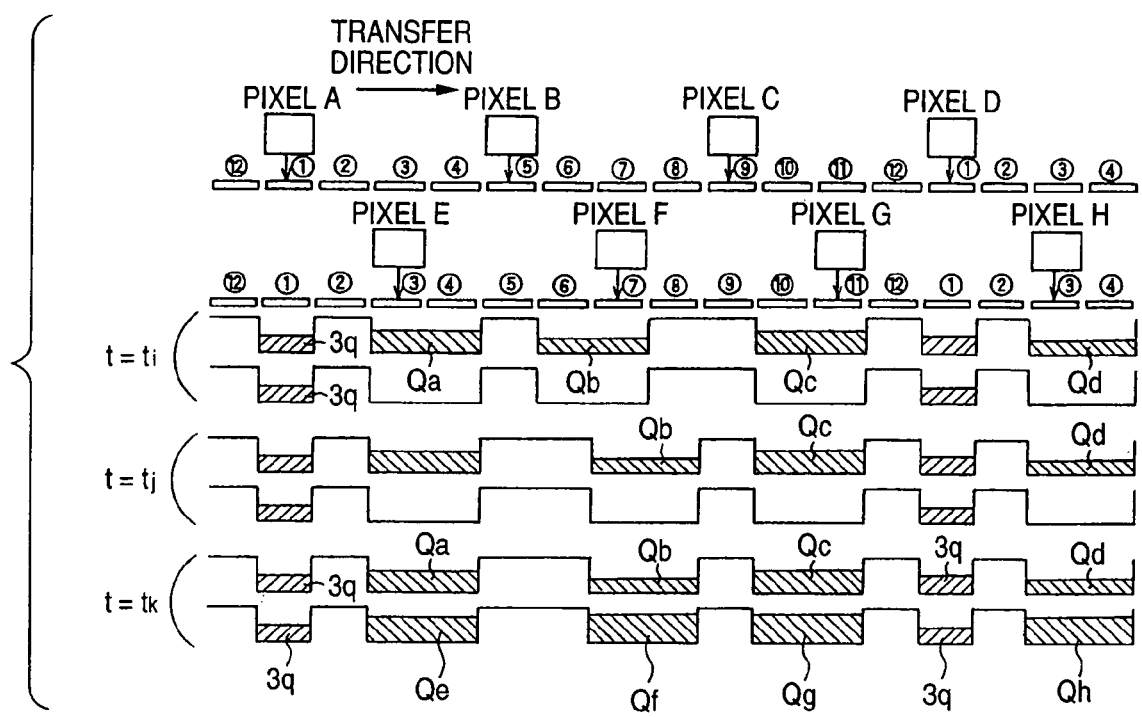
FIG. 13 is a timing chart connected to FIG. 12.

FIGS. 12 and 13 are timing charts for explaining a transfer method in the solid-state image capturing device according to the fifth embodiment. The fifth embodiment is basically the same as the fourth embodiment described with reference to FIG. 10, and the width of an electric potential well for smear charge transfer corresponds to one electrode and the width of an electric potential well for signal charge transfer corresponds to two electrodes, and progressive scanning for reading and transferring the signal charges of all pixels is carried out. The fifth embodiment is different from the fourth embodiment in that the numbers of the electrode terminals are different from each other. For this reason, the number of pins to be provided in the solid-state image capturing device is decreased and a transfer pulse can be created easily.

According to the embodiment, an image having a high resolution is obtained because of the progressive scanning type. In addition, the signal charge is transferred through the electric potential well for two electrodes to be the electric potential well for signal charge transfer. Consequently, it is possible to obtain an advantage that an image has a wide dynamic range, and furthermore, a transfer pulse can be created easily and the number of the pins of the solid-state image capturing device is decreased.

Figure 14:
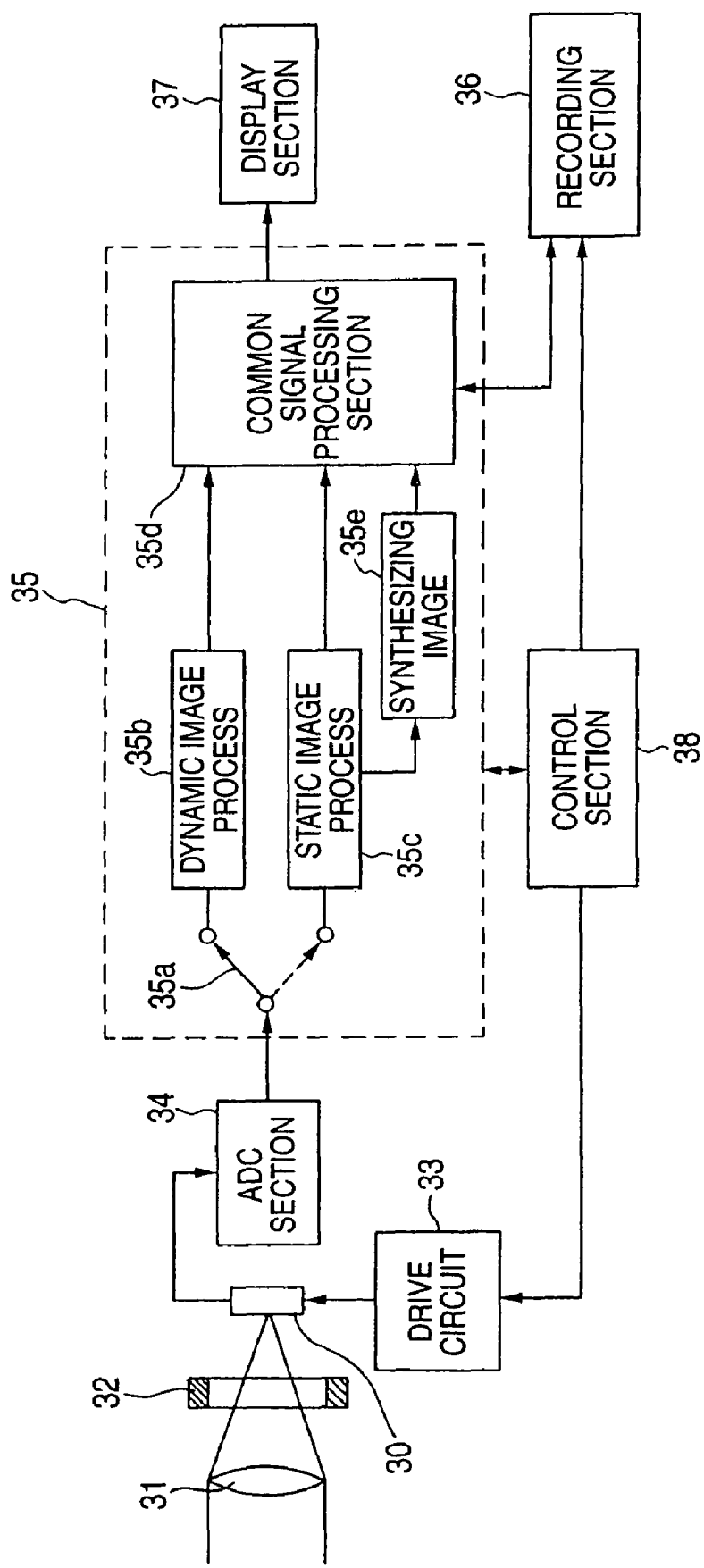
FIG. 14 is a diagram showing the structure of a digital still camera according to another embodiment of the invention.

FIG. 14 is a diagram showing the structure of a digital still camera according to another embodiment of the invention. Differently from the digital still camera according to the embodiment shown in FIG. 1, an image synthesizing section 35e is provided in a signal processing section 35 and a plurality of image signals which have been subjected to a static image processing are synthesized. For the solid-state image capturing device 30 to be mounted on the digital still camera, any of the solid-state image capturing devices according to the embodiments may be used.

In the digital still camera according to the embodiment, it is possible to select a high-speed photographing mode for outputting a static image by the single photographing of a high-speed shutter, a low-speed photographing mode for outputting a static image by single photographing using a mechanical shutter, and furthermore, a synthetic photographing mode for synthesizing and outputting a static image photographed by the high-speed shutter and a static image photographed by the low-speed shutter continuously therewith.

FIG. 15 is a diagram showing an operation timing in the synthetic photographing mode. A processing of draining the stored charges of a photoreceptor group with an OFD pulse and a processing of sweeping the stored charges of a vertical CCD register with a sweeping pulse X are the same as those of the embodiments described above. Also in the embodiment, a signal charge read from the solid-state image capturing device with a reading pulse B1 is discharged as a dummy output.

A signal charge photographed by the high-speed shutter is read with a reading pulse B2 after the OFD pulse, and is transferred through the vertical CCD register 12 and the horizontal CCD register 13 as described in each of the embodiments, and is output as a high-speed shutter static image S1 to the signal processing section 35 (FIG. 14) after a next vertical blanking signal A2.

While a signal charge is read from a photoreceptor onto the vertical CCD register 12 by the high-speed shutter and a mechanical shutter is then closed, the signal charge stored in the photoreceptor is read with a reading pulse B3 generated in a next vertical blanking signal A3 and is transferred in the same manner, and is output as a low-speed shutter static image S2 to the signal processing section 35. The signal processing section 35 synthesizes these two static images S1 and S2 by the synthesizing section 35e and processes them by a common signal processing section 35d, and is then stored in a recording section 36 and is displayed on a display section 37. The static images thus synthesized have a wide dynamic range.

Figure 16A:
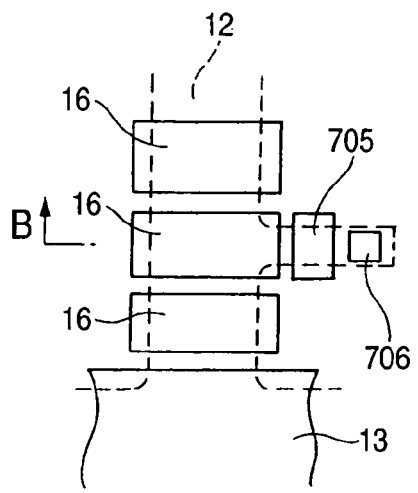

FIG. 16 is a view for explaining a structure in which a smear charge transferred immediately before a horizontal CCD register 13 is discharged as described above, and FIG. 16(a) is a plan view showing a solid-state image capturing device, illustrating the details of the vicinity of the horizontal CCD register 13 in FIG. 2, for example. In this example, a second transfer electrode 16 from the horizontal CCD register 13 is provided with a smear charge discharging structure. The smear charge discharging structure is provided in all the second transfer electrodes 16 in a transverse row from the horizontal CCD register 13 shown in FIG. 2.

Figure 16B:
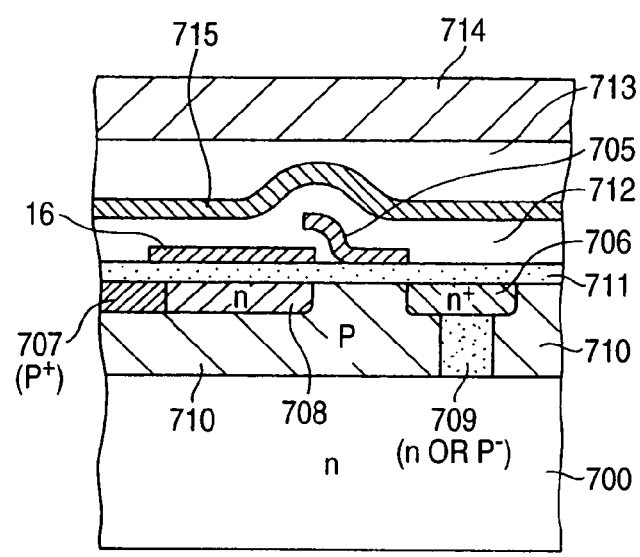

FIG. 16(b) is a sectional view taken along a line B-B in FIG. 16(a). A P well 710 is provided on the surface side of an n-type semiconductor substrate 700 of the solid-state image capturing device, and a buried channel 708 comprising an n-type semiconductor layer is formed on the surface of the P well 710. An electric charge is stored in and transferred to the buried channel 708, and a channel stop region 707 is provided adjacently to the buried channel 708 in order to divide an adjacent vertical CCD register 12 from the buried channel 708.

A gate insulating film 711 is provided on the surface of the P well 710, and the transfer electrode 16 formed of polysilicon is provided on the buried channel 708 through the gate insulating film 711. A drain 706 is provided on the surface of the P well 710 in a position placed slightly apart from the buried channel 708, and the drain 706 and the semiconductor substrate 700 are connected to each other through a drain connecting region 709.

A control electrode 705 for smear charge discharge which is formed of polysilicon is provided between the buried channel 708 and the drain 706 through the gate insulating film 711. The transfer electrode 16 and the control electrode 705 are covered with an insulating film 712, a light shielding film 715 is provided thereon, and furthermore, an insulating film 713 is provided thereon and a transparent film 714 is provided as an uppermost layer.

With such a structure, when a smear charge is transferred to the transfer electrode 16 juxtaposed with the control electrode 705, a control voltage is applied to the control electrode 705 so that a smear charge stored between the transfer electrode 16 and the buried channel 708 provided thereunder is transferred to the drain 706 and is discharged to the semiconductor substrate 700.

Figure 17:
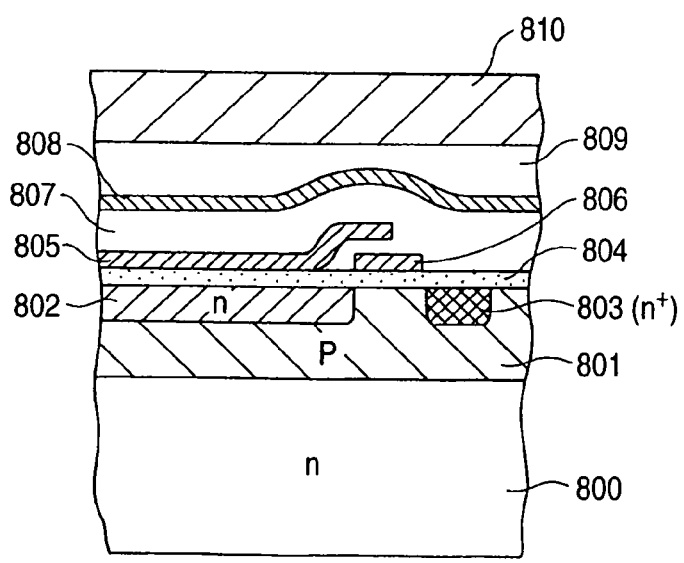
FIG. 17 is a view illustrating a structure in which the smear charge transferred in the embodiment of the invention is discharged through a horizontal CCD register.

FIG. 17 is a view showing an example in which the smear charge discharging structure is provided at the end of the horizontal CCD register 13 on the opposite side of the vertical CCD register 12. A P well 801 is provided on the surface side of an n-type semiconductor substrate 800, and a buried channel 802 and a drain 803 are provided on the surface of the P well 801. A gate insulating film 804 is provided on the surface of the P well 801, and a transfer electrode 805 for the horizontal CCD register is provided above the buried channel 802 through the gate insulating film 804 and a control electrode 806 for smear charge discharge is provided above a portion between the buried channel 802 and the drain 803.

The transfer electrode 805 and the control electrode 806 are covered with an insulating film 807, a light shielding film 808 is provided thereon, and furthermore, an insulating film 809 is provided thereon and a transparent film 810 is provided as an uppermost layer.

With such a structure, when the smear charge is transferred between the transfer electrode 805 and the buried channel 802 provided thereunder, a control voltage is applied to the control electrode 806 so that the smear charge is transferred to the drain 803 and is thus discharged.

According to each of the embodiments described above, the smear charges in the vertical CCD register are swept with a sweeping pulse and the smear charges entering the transfer electrode are then collected and transferred through a special electric potential well, and are thus discharged. Therefore, it is possible to obtain an excellent image having no deterioration in picture quality which is caused by smear.

As described above, in the case in which a high-speed shutter is released by an electronic shutter, the transfer of the vertical register is carried out with a mechanical shutter opened. Therefore, it is necessary to collectively transfer and discharge the smear charges. In the case in which a low-speed shutter is released by the mechanical shutter, however, the transfer of the vertical register is carried out with the mechanical shutter closed. Therefore, the surface of the solid-state image capturing device is not exposed to outside light and the smear charge does not need to be transferred and discharged.

For this reason, in the digital still camera, it is possible to select a high-speed photographing mode in which smear charges are collected, transferred and discharged and a low-speed photographing mode in which the smear charges are neither collected, transferred nor discharged according to the embodiments, and it is preferable that any of the modes should be selected to capturing the image of an object. In this case, the mode may be selected manually or automatically interlockingly with the operation of the mechanical shutter.

Moreover, while the description has been given by taking the interline transfer type CCD area image sensor as an example in the embodiments, the invention can also be applied to a frame interline transfer type CCD area image sensor. Furthermore, while the smear charge is discharged at a vertical register end or a horizontal register output end in the embodiments, a voltage signal by the smear charge may be exactly output from the solid-state image capturing device and may be canceled in the signal processing section.

According to the invention, it is possible to output an excellent image having no deterioration in picture quality which is caused by smear.

What is claimed is:

1. A solid-state image capturing device, comprising:
   a pixel array arranged in a row direction and a column direction orthogonal thereto;
   a vertical register having a plurality of transfer electrodes used to read signal charges that are generated in respective pixels when the respective pixels receive light, the vertical register that sequentially transfers the signal charges in the column direction upon receipt of a transfer pulse;
   a horizontal register that receives the signal charges transferred by the vertical register and transfers the signal charges in a horizontal direction;
   a smear drain structure that is placed slightly apart from the vertical register, wherein the vertical register and the smear drain structure are disposed on one side of the horizontal register in the column direction;
   an output section that outputs the signal charges transferred by the horizontal register;
   a control section that generates first electronic potential wells and applies a certain transfer pulse to the plurality of transfer electrode to collect smear charges that are generated in the vertical register into the first electronic potential wells, wherein
   the control section causes the vertical register and the smear drain structure to transfer the first electronic potential wells, in which the smear charges are collected, to the smear drain structure, and
   the smear drain structure discharges the transferred smear charges,
   wherein
   the control section applies the certain transfer pulse to the plurality of transfer electrode to collect the smear charges into the first electronic potential wells before the signal charges are read from the respective pixels to the vertical register,
   the control section generates second electronic potential wells after the smear charges are collected into the first electronic potential wells and applies another certain transfer pulse to the transfer electrodes to transfer the signal charges from the respective pixels to the second electronic potential wells, and
   the first electronic potential wells and the second electronic potential wells are concurrently transferred to the horizontal register without mixing the smear charges with the signal charges.

2. The solid-state image capturing device according to claim 1, wherein the smear drain structure is placed immediately before the horizontal register in the column direction.

3. The solid-state image capturing device according to claim 1, wherein at least one of the transfer electrodes is disposed between the horizontal register and a transfer electrode adjacent, in the row direction, to the smear drain structure.

4. The solid-state image capturing device according to claim 1, wherein
   the vertical register further includes a channel below the transfer electrodes,
   the signal charges and the smear charges are transferred in the channel in the column direction, the smear drain structure includes a drain and a gate electrode that is disposed above at least a position between the channel of the vertical register and the drain.

5. The solid-state image capturing device according to claim 4, wherein
the control section applies another certain transfer pulse to the plurality of transfer electrodes to transfer the first electric potential wells, in which the smear charges are collected, to a transfer electrode adjacent to the smear drain structure in the row direction,
the control section applies further another certain transfer pulse to the gate electrode of the smear drain structure to transfer the smear charges from the adjacent transfer electrode to the drain, and
the smear charges transferred to the drain are discharged to a substrate.

6. A solid-state image capturing device, comprising:
a pixel array arranged in a row direction and a column direction orthogonal thereto;
a vertical register having a plurality of transfer electrodes used to read signal charges that are generated in respective pixels when the respective pixels receive light, the vertical register that sequentially transfers the signal charges in the column direction upon receipt of a transfer pulse;
a horizontal register that receives the signal charges transferred by the vertical register and transfers the signal charges in a horizontal direction;
a smear drain structure that is placed across the horizontal register from the vertical register;
an output section that outputs the signal charges transferred by the horizontal register;
a control section that generates first electronic potential wells and applies a certain transfer pulse to the plurality of transfer electrode to collect smear charges that are generated in the vertical register into the first electronic potential wells, wherein
the control section causes the vertical register, the horizontal register and the smear drain structure to transfer the first electronic potential wells, in which the smear charges are collected, to the smear drain structure, and
the smear drain structure discharges the transferred smear charges, wherein
the control section applies the certain transfer pulse to the plurality of transfer electrode to collect the smear charges into the first electronic potential wells before the signal charges are read from the respective pixels to the vertical register,
the control section generates second electronic potential wells after the smear charges are collected into the first electronic potential wells and applies another certain transfer pulse to the transfer electrodes to transfer the signal charges from the respective pixels to the second electronic potential wells, and
the first electronic potential wells and the second electronic potential wells are concurrently transferred to the horizontal register without mixing the smear charges with the signal charges.

7. The solid-state image capturing device according to claim 6, wherein the smear drain structure is placed at an end of the horizontal register.

8. The solid-state image capturing device according to claim 6, wherein the smear drain structure includes a drain and a gate electrode that is disposed above at least a position between the horizontal register and the drain.

9. The solid-state image capturing device according to claim 8, wherein
the control section applies another certain transfer pulse to the plurality of transfer electrodes to transfer the first electric potential wells, in which the smear charges are collected, to the horizontal register,
the control section applies further another certain transfer pulse to the gate electrode of the smear drain structure to transfer the smear charges from the horizontal register to the drain, and
the smear charges transferred to the drain are discharged to a substrate.

10. A solid-state image capturing device, comprising:
a pixel array arranged in a row direction and a column direction orthogonal thereto;
a vertical register having a plurality of transfer electrodes used to read signal charges that are generated in respective pixels when the respective pixels receive light, the vertical register that sequentially transfers the signal charges in the column direction upon receipt of a transfer pulse;
a horizontal register that receives the signal charges transferred by the vertical register and transfers the signal charges in the row direction;
an output section that outputs the signal charges transferred by the horizontal register; and
a driving section that
generates groups of first electric potential wells, and
applies a certain transfer pulse to the plurality of transfer electrodes to collect smear charges in each group into one first electric potential well, wherein,
the driving section causes the vertical register to transfer the first electronic potential wells, in which the smear charges are collected,
the solid-state image capturing device further comprising smear drain means for discharging the transferred smear charges,
wherein
the driving section applies the certain transfer pulse to the plurality of transfer electrode to collect the smear charges in each group into the one first electronic potential well before the signal charges are read from the respective pixels to the vertical register,
the driving section generates second electronic potential wells after the smear charges in each group are collected into the one first electronic potential well and applies another certain transfer pulse to the transfer electrodes to transfer the signal charges from the respective pixels to the second electronic potential wells, and
the first electronic potential wells and the second electronic potential wells are concurrently transferred to the horizontal register without mixing the smear charges with the signal charges.

* * * * *